(12) United States Patent
Morikoshi

(10) Patent No.: US 10,595,476 B2
(45) Date of Patent: Mar. 24, 2020

(54) EMITTER AND DRIP IRRIGATION TUBE

(71) Applicant: Enplas Corporation, Saitama (JP)

(72) Inventor: Daisuke Morikoshi, Saitama (JP)

(73) Assignee: Enplas Corporation, Saitama (JP)

( * ) Notice: Subject to any disclaimer, the term of this patent is extended or adjusted under 35 U.S.C. 154(b) by 109 days.

(21) Appl. No.: 15/577,148

(22) PCT Filed: May 17, 2016

(86) PCT No.: PCT/JP2016/064594
§ 371 (c)(1),
(2) Date: Nov. 27, 2017

(87) PCT Pub. No.: WO2016/190167
PCT Pub. Date: Dec. 1, 2016

(65) Prior Publication Data
US 2018/0168116 A1 Jun. 21, 2018

(30) Foreign Application Priority Data
May 28, 2015 (JP) ................................ 2015-108617

(51) Int. Cl.
*A01G 25/02* (2006.01)
*A01G 25/00* (2006.01)

(52) U.S. Cl.
CPC ...... *A01G 25/023* (2013.01); *A01G 2025/006* (2013.01); *Y02A 40/237* (2018.01)

(58) Field of Classification Search
CPC .... A01G 25/02; A01G 25/023; A01G 25/026; A01G 25/06; A01G 2025/006; Y02A 40/237; B05B 1/202

(Continued)

(56) References Cited

U.S. PATENT DOCUMENTS 4,687,143 A 8/1987 Gorney
6,027,048 A 2/2000 Mehoudar
(Continued)

FOREIGN PATENT DOCUMENTS

CN 105792636 A 7/2016
EP 3075234 A1 10/2016
(Continued)

OTHER PUBLICATIONS

Extended European Search Report for 16799873.1 dated Jan. 2, 2019.
(Continued)

*Primary Examiner* — Cody J Lieuwen
(74) *Attorney, Agent, or Firm* — Brundidge & Stanger, P.C.

(57) ABSTRACT

This emitter (120) has a first valve seat part (174) provided around a hole (173) which forms a portion of a flow path between a reduced-pressure flow path and a discharge part. The first valve seat part (174) is formed by a three-step recessed circumferential surface, and is provided with one groove (175) which intersects said three-step recessed circumferential surface, and becomes shallower as said groove approaches the hole (173). As the external liquid pressure increases, a film (140) gradually bends towards the first valve seat part (174), and the open area of the groove (175) gradually decreases. The flow rate of an irrigation liquid is adjusted to an amount capable of passing through the opening of the groove (175).

11 Claims, 22 Drawing Sheets

(58) Field of Classification Search
USPC .......................................................... 239/542
See application file for complete search history.

(56) References Cited

U.S. PATENT DOCUMENTS

| | | | | |
|---|---|---|---|---|
| 2002/0070297 A1* | 6/2002 | Bolinis | ................ | A01G 25/023 |
| | | | | 239/542 |
| 2003/0092817 A1* | 5/2003 | Ruskin | .................. | A01G 25/02 |
| | | | | 524/445 |
| 2004/0164185 A1* | 8/2004 | Giuffre | ................ | A01G 25/023 |
| | | | | 239/542 |
| 2005/0284966 A1* | 12/2005 | DeFrank | .............. | A01G 25/023 |
| | | | | 239/542 |
| 2006/0163388 A1* | 7/2006 | Mari | ................... | A01G 25/023 |
| | | | | 239/542 |
| 2009/0173811 A1* | 7/2009 | Gorney | ................ | A01G 25/023 |
| | | | | 239/542 |
| 2009/0266919 A1* | 10/2009 | Mavrakis | ............. | A01G 25/023 |
| | | | | 239/542 |
| 2010/0282873 A1* | 11/2010 | Mattlin | ................ | A01G 25/023 |
| | | | | 239/542 |
| 2011/0192916 A1* | 8/2011 | Causby | ................ | A01G 25/023 |
| | | | | 239/542 |
| 2012/0305676 A1* | 12/2012 | Keren | .................. | A01G 25/023 |
| | | | | 239/542 |
| 2015/0223414 A1 | 8/2015 | Kidachi | | |
| 2016/0295816 A1 | 10/2016 | Kidachi | | |

FOREIGN PATENT DOCUMENTS

| | | |
|---|---|---|
| EP | 3075236 A1 | 10/2016 |
| JP | 2010-046094 A | 3/2010 |
| JP | 2015-62369 A | 4/2015 |
| JP | 2016073235 A | 5/2016 |
| WO | 2014050140 A1 | 4/2014 |

OTHER PUBLICATIONS

International Search Report from International Application No. PCT/JP2016/064594 dated Jul. 26, 2016.

* cited by examiner

EMITTER AND DRIP IRRIGATION TUBE

TECHNICAL FIELD

The present invention relates to an emitter and a drip irrigation tube including the emitter.

BACKGROUND ART

Conventionally, a drip irrigation method is known as a method for culturing plants. In the drip irrigation method, a drip irrigation tube is disposed on the soil where plants are planted, and irrigation liquid such as water and liquid fertilizer is dropped from the drip irrigation tube to the soil. The drip irrigation method has been increasingly attracting attention in recent years since the method can minimize the consumption rate of the irrigation liquid.

Normally, the drip irrigation tube includes a tube in which a plurality of through holes for discharging irrigation liquid are formed, and a plurality of emitters (also called "drippers") for discharging irrigation liquid from respective through holes. In addition, as the emitter, emitters which are joined on the inner wall surface of the tube (see, for example, PTL 1), and emitters which are inserted to the tube from the exterior of the tube are known.

PTL 1 discloses an emitter configured to be joined on the inner wall surface of a tube. The emitter disclosed in PTL 1 includes a first member including a water intake port for intake of irrigation liquid, a second member including an outlet for discharging the irrigation liquid, and a film member disposed between the first member and the second member. On the inside of the first member, a valve seat part disposed to surround the water intake port and a pressure reducing groove that serves as a part of a pressure reduction channel are formed. In the film member, a through hole is formed at a position corresponding to the downstream end of the pressure reducing groove.

When the first member, the film member and the second member are stacked, the pressure reduction channel is formed, and the film member makes contact with the valve seat part to close the water intake port. In addition, a channel for carrying the irrigation liquid from the water intake port to the outlet is formed.

In the emitter disclosed in PTL 1, when the pressure of the irrigation liquid in the tube is equal to or greater than a predetermined pressure, the film member closing the water intake port is pushed by the irrigation liquid, and the irrigation liquid flows into the emitter. The pressure of the irrigation liquid proceeded into the emitter is reduced by the reduction channel, and the irrigation liquid is quantitatively discharged from the outlet.

CITATION LIST

Patent Literature

PTL 1
Japanese Patent Application Laid-Open No. 2010-046094

SUMMARY OF INVENTION

Technical Problem

In the drip irrigation tube using the emitter disclosed in PTL 1, however, the irrigation liquid flows into the emitter only when the pressure of the irrigation liquid in the tube is equal to or greater than the predetermined pressure. As a result, in some situation, the emitters do not function when the pressure of the irrigation liquid in the tube is significantly low. Consequently, there is a possibility that emitters disposed at a position remote from the liquid feed pump for sending the irrigation liquid to the tube do not appropriately function while emitters in a region near the liquid feed pump appropriately function. Accordingly, the discharge rate of the irrigation liquid from the emitters can vary depending on the watering positions, thus limiting the watering distance.

In addition, in the emitter disclosed in PTL 1, when the pressure of the irrigation liquid further increases from the predetermined pressure, the discharge rate of the irrigation liquid also increases, and the discharge rate of the irrigation liquid from the emitter exceeds the desired flow rate in some situation. In view of this, the emitter disclosed in PTL 1 has a room for improvement in terms of the control of the discharge rate when the pressure of the irrigation liquid is high.

An object of the present invention is to provide an emitter and a drip irrigation tube which can quantitatively discharge irrigation liquid even when the pressure of the irrigation liquid is low, and can suppress fluctuations of the discharge rate of the irrigation liquid when the pressure of the irrigation liquid is high.

Solution to Problem

Embodiments of the present invention provide an emitter configured to be joined on an inner wall surface of a tube for carrying irrigation liquid at a position corresponding to a discharging port communicating between inside and outside of the tube, the emitter being configured to quantitatively discharge the irrigation liquid in the tube from the discharging port to the outside of the tube, the emitter including: a water intake part for intake of the irrigation liquid; a first pressure reduction channel part for forming a first pressure reduction channel that allows the irrigation liquid received at the water intake part to flow therethrough while reducing a pressure of the irrigation liquid received at the water intake part; a discharge rate adjusting part for controlling a flow rate of the irrigation liquid supplied from the first pressure reduction channel in accordance with a pressure of the irrigation liquid in the tube; and a discharging part for housing the irrigation liquid supplied from the discharge rate adjusting part, the discharging part being configured to face the discharging port. The discharge rate adjusting part includes a hole for communicating between the first pressure reduction channel and the discharging part, a first valve seat part surrounding an edge of the hole, and composed of a protruded annular surface slanted from the edge or a recessed annular surface slanted toward the edge, a groove formed on a surface of the first valve seat part to cross the first valve seat part, in which a depth of the groove from the surface of the first valve seat part gradually decreases in a direction from a top edge to a bottom edge of the first valve seat part at at least a bottom edge part of the first valve seat part, and a film having flexibility, and disposed such that the film is separated from the first valve seat part at a position where the film is allowed to gradually make close contact with the first valve seat part from the top edge toward the bottom edge when the pressure of the irrigation liquid in the tube is equal to or greater than a set value.

In addition, embodiments of the present invention provide a drip irrigation tube including: the tube including the discharging port for discharging irrigation liquid; and the emitter joined on the inner wall surface of the tube at a position corresponding to the discharging port.

Advantageous Effects of Invention

According to the present invention, it is possible to provide an emitter and a drip irrigation tube which can quantitatively discharge irrigation liquid even when the pressure of the irrigation liquid is low, and can suppress fluctuations of the discharge rate of the irrigation liquid when the pressure of the irrigation liquid is high.

DESCRIPTION OF EMBODIMENTS

First Embodiment

A first embodiment of the present invention is described below in detail with reference to the accompanying drawings.

Figure 1A:
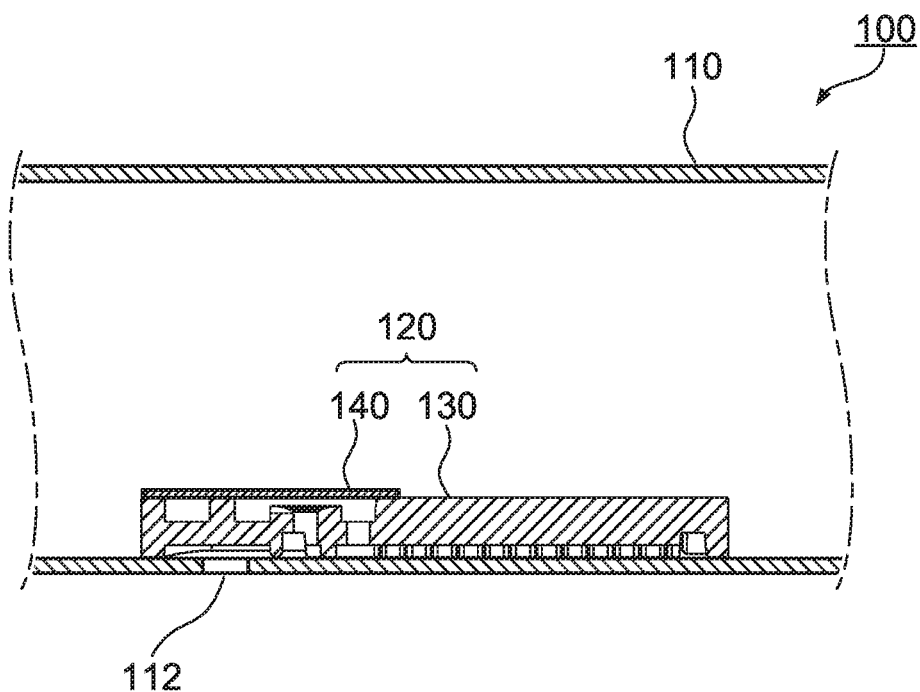
FIG. 1A is a sectional view in a direction along the axis of a drip irrigation tube according to a first embodiment of the present invention.
Figure 1B:
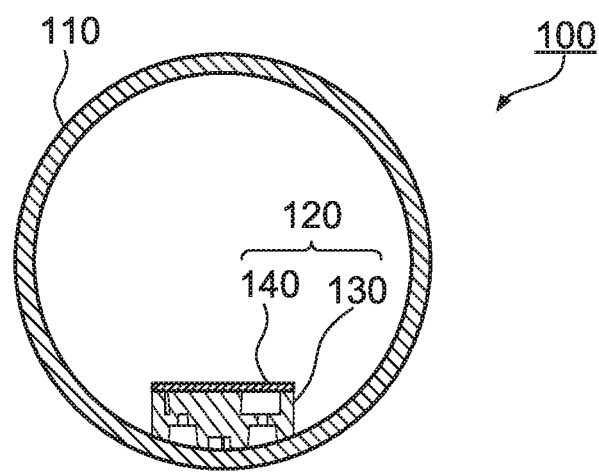
FIG. 1B is a sectional view in a direction perpendicular to the axis of the drip irrigation tube.

FIG. 1A is a sectional view along the axial direction of drip irrigation tube 100 according to the first embodiment of the present invention, and FIG. 1B is a sectional view in a direction perpendicular to the axis of drip irrigation tube 100. As illustrated in FIG. 1A and FIG. 1B, drip irrigation tube 100 includes tube 110 and emitter 120.

Tube 110 is a pipe for carrying irrigation liquid. The material of tube 110 is not limited. In the present embodiment, the material of tube 110 is polyethylene. The cross-sectional shape and the cross-sectional area of tube 110 in the direction perpendicular to the axis direction can be appropriately set as long as emitter 120 can be installed inside tube 110. In the wall of tube 110, a plurality of discharging ports 112 for discharging irrigation liquid are formed at a predetermined interval (for example, 200 to 500 mm) in the axis direction of tube 110. The diameter of the edge of discharging port 112 can be appropriately set as long as the irrigation liquid can be discharged at a desired flow rate, and is, for example, 1.5 mm. Emitters 120 are joined at respective positions corresponding to discharging ports 112 of the inner wall surface of tube 110.

Emitter 120 is joined on the inner wall surface of tube 110 at the convex surface of emitter main body 130. Emitter 120 is joined to tube 110 by a publicly known method for example, and the examples of the way of joining emitter 120 to tube 110 include welding and/or fusing of a resin material of emitter 120 or tube 110, and bonding with an adhesive agent. Normally, discharging port 112 is formed after tube 110 and emitter 120 are joined to each other, and discharging port 112 may be formed before tube 110 and emitter 120 are joined to each other.

Figure 2A:
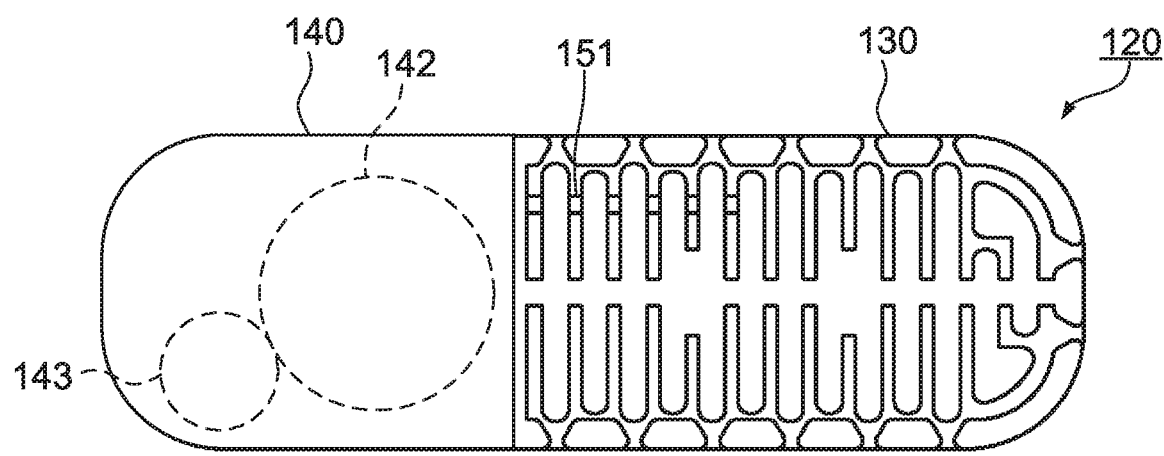
FIG. 2A is a plan view of the emitter according to the first embodiment.
Figure 2B:
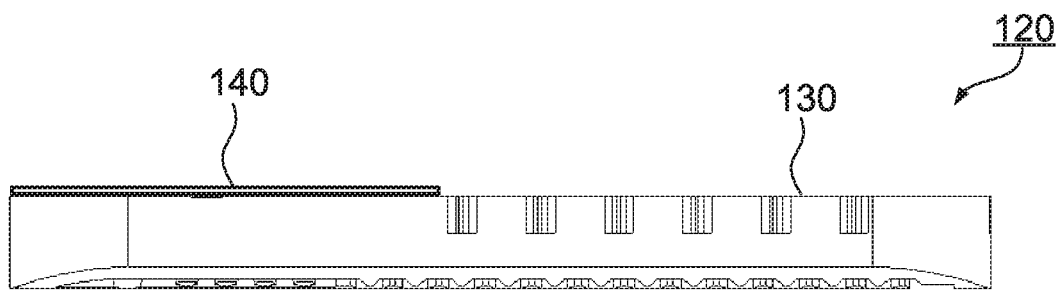
FIG. 2B is a front view of the emitter.
Figure 2C:
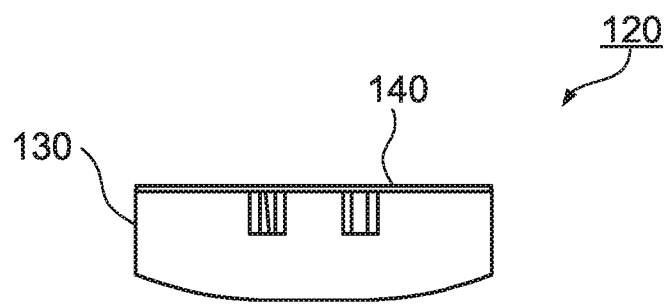
FIG. 2C is a right side view of the emitter.

FIG. 2A is a plan view of emitter 120, FIG. 2B is a front view of emitter 120, and FIG. 2C is a right side view of emitter 120. As illustrated in FIG. 2A to FIG. 2C, emitter 120 includes emitter main body 130, and film 140. Emitter main body 130 is composed of the above-mentioned convex surface (which is referred to also as "bottom surface") matching the inner wall surface of tube 110, a plane surface (which is referred to also as "top surface") located on the side opposite to the bottom surface, and recesses and through holes formed in these surfaces.

The size and the shape of emitter 120 can be appropriately set as long as a desired function can be ensured. For example, the planar shape of emitter 120 is a substantially rectangular shape with chamfered four corners, and emitter 120 has a long side length of 25 mm, a short side length of 8 mm, and a height of 2.5 mm.

Figure 3A:
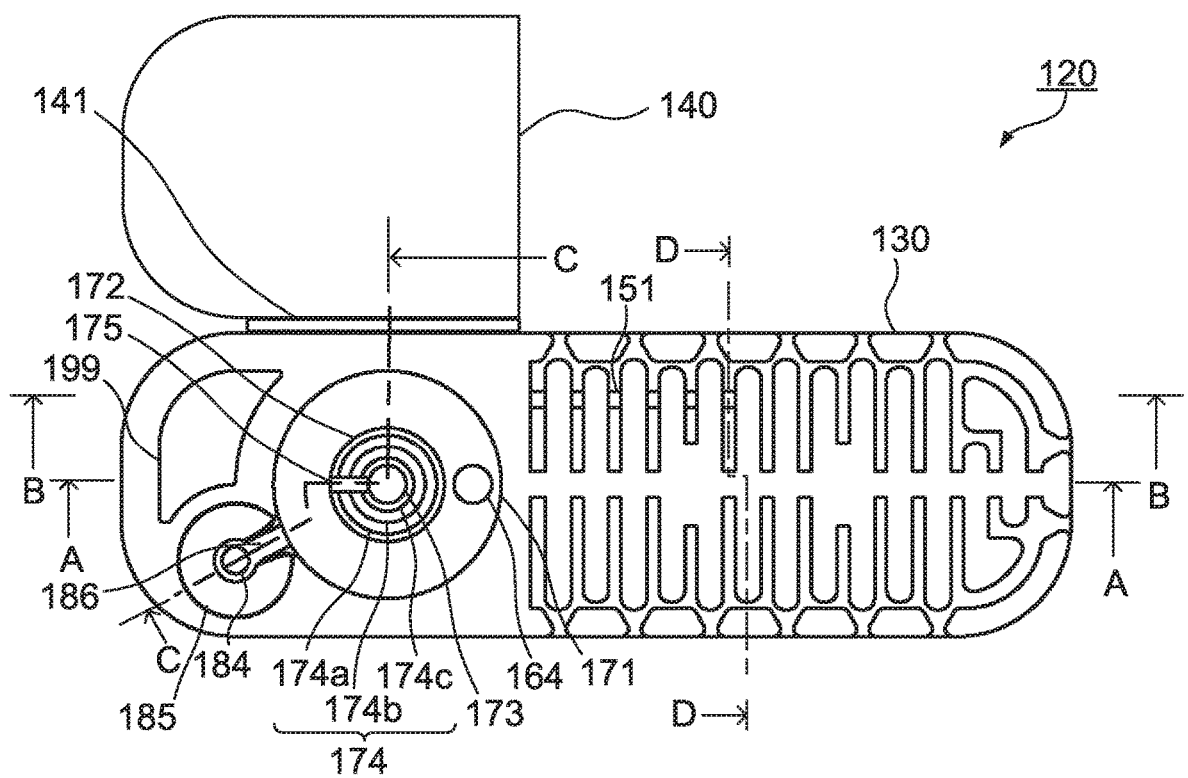
FIG. 3A is a plan view of the emitter according to the first embodiment before a film is joined.
Figure 3B:
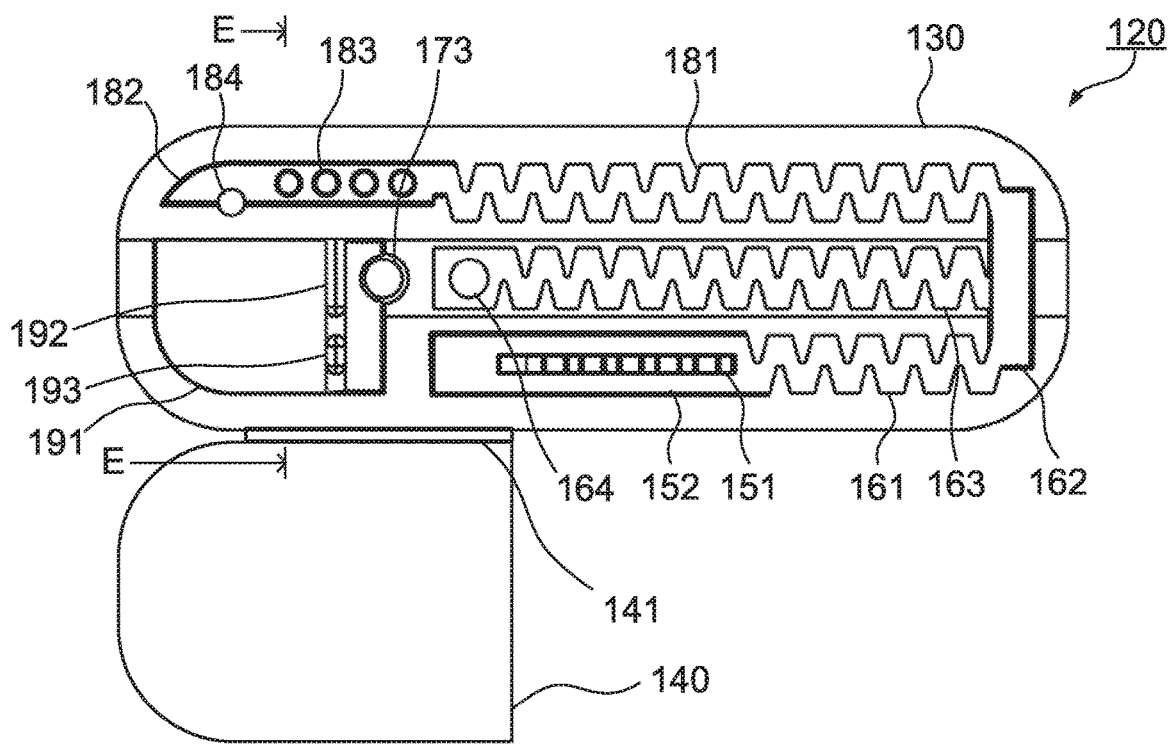
FIG. 3B is a bottom view of the emitter before the film is joined.
Figure 4A:
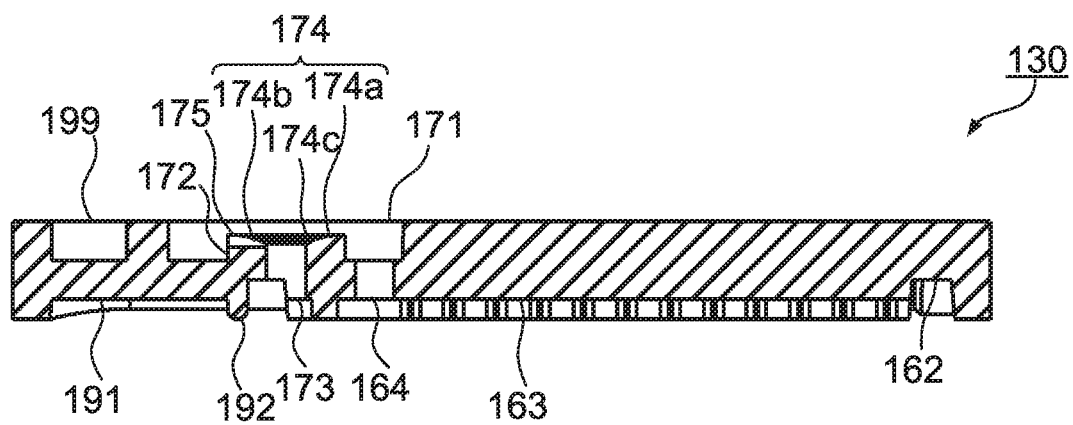
FIG. 4A is a cross-sectional view of an emitter main body of the first embodiment taken along line A-A of FIG. 3A.
Figure 4B:
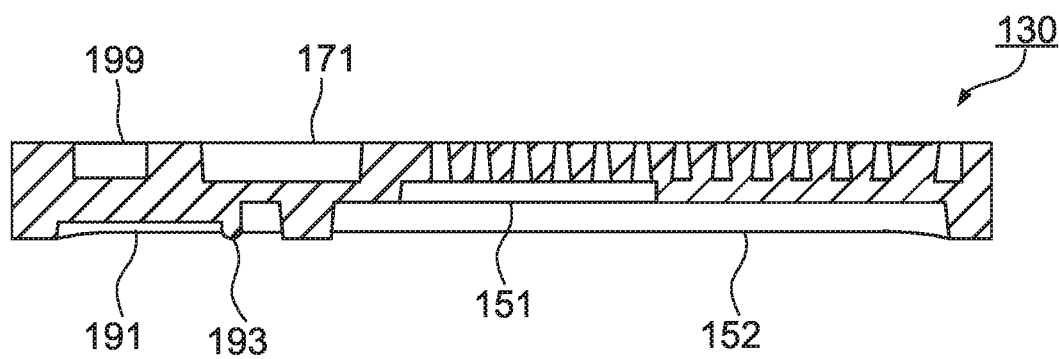
FIG. 4B is a cross-sectional view of the emitter main body taken along line B-B of FIG. 3A.
Figure 4C:
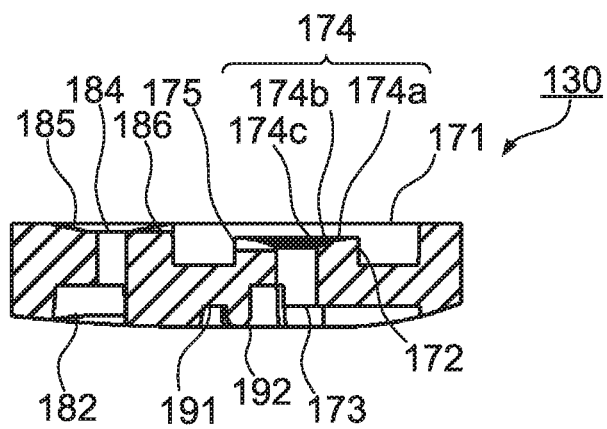
FIG. 4C is a cross-sectional view of the emitter main body taken along line C-C of FIG. 3A.
Figure 5A:
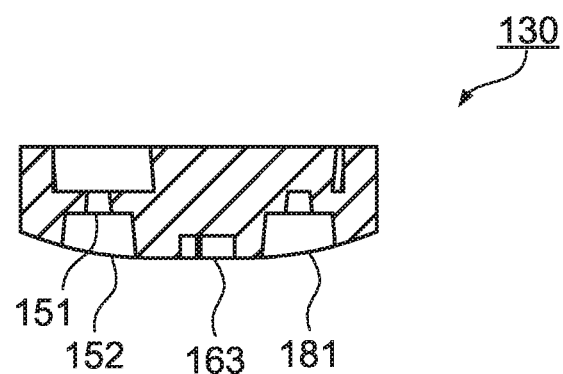
FIG. 5A is a cross-sectional view of the emitter main body of the first embodiment taken along line D-D of FIG. 3A.
Figure 5B:
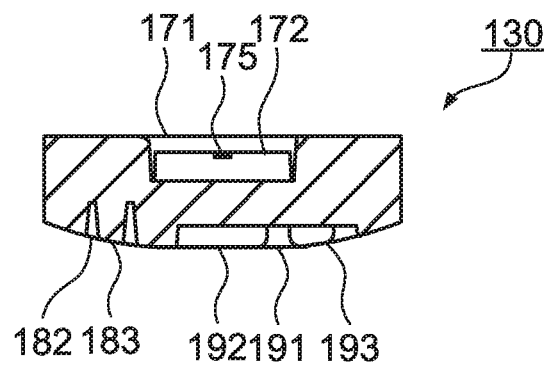
FIG. 5B is a cross-sectional view of the emitter main body taken along line E-E of FIG. 3B.

FIG. 3A is a plan view of emitter 120 before the joining of film 140, and FIG. 3B is a bottom view of emitter 120 before the joining of film 140. In addition, FIG. 4A is a cross-sectional view of emitter main body 130 taken along line A-A of FIG. 3A, FIG. 4B is a cross-sectional view of emitter main body 130 taken along line B-B of FIG. 3A, and FIG. 4C is a cross-sectional view of emitter main body 130 taken along line C-C of FIG. 3A. Further, FIG. 5A is a cross-sectional view of emitter main body 130 taken along line D-D of FIG. 3A, and FIG. 5B is a cross-sectional view of emitter main body 130 taken along line E-E of FIG. 3B.

As illustrated in FIG. 3A and FIG. 3B, emitter 120 is integrally molded with a resin material having flexibility. For example, film 140 is disposed integrally with emitter main body 130 through hinge part 141 at a side edge of emitter main body 130. When turned about hinge part 141, film 140 is disposed at a position where it covers the discharge rate adjusting part and the valve seat part. The thickness of film 140 is, for example, 0.3 mm.

The integrally molded product of emitter main body 130 and film 140 is produced by injection molding, for example. The resin material is a resin material having a desired flexibility when emitter main body 130 and film 140 are molded, and the examples of the material include polyethylene, polypropylene and silicone. In addition, the resin material may be an industrial material having rubber elasticity, and the examples of the material include elastomer and rubber.

Emitter main body 130 includes a water intake part for intake of the irrigation liquid in tube 110, a pressure reduction channel part for forming a pressure reduction channel that allows the irrigation liquid received at the water intake part to flow therethrough while reducing the pressure of the irrigation liquid, a discharge rate adjusting part for controlling the flow rate of the irrigation liquid supplied from the pressure reduction channel in accordance with the pressure of the irrigation liquid in tube 110 (which is also referred to simply as "outer liquid pressure"), a bypass channel part for forming a bypass channel that bypasses a part of the downstream side of the pressure reduction channel part and communicates between the upstream side of the discharge rate adjusting part and the water intake part, and a discharging part configured to face discharging port 112 and house the irrigation liquid supplied from the discharge rate adjusting part.

The water intake part includes a screen part, slit 151 to which the irrigation liquid past the screen part is supplied, and recess 152 configured to form a part of a channel of the irrigation liquid in emitter 120 and house the irrigation liquid past slit 151.

The screen part is minute recesses and projections formed in the top surface, and, roughly speaking, includes a first outer groove extending along the one end side edge of the top surface of emitter main body 130 in the longitudinal direction and having a U-like shape in plan view, a second outer groove that communicates between the first outer groove and the side of emitter main body 130, and a third outer groove extending to the first outer groove in the short direction of emitter main body 130 from the center portion of emitter main body 130 in the short direction. The second outer groove forms a plurality of projections extending along the edge of the top surface of emitter main body 130, and the third outer groove extends to the first outer groove from the center portion of emitter main body 130 in the short direction, and forms a plurality of slender projections in parallel with each other in the longitudinal direction. The corners of the planar shapes of the projections are appropriately chamfered.

Slit 151 is formed along the longitudinal direction across the second outer grooves, and opens to the second outer groove. Recess 152 is formed on the bottom surface of emitter main body 130, and has a substantially rectangular slender shape in the longitudinal direction in plan view. Slit 151 opens at the bottom of recess 152. That is, slit 151 communicates between the second outer groove and recess 152.

The pressure reduction channel part includes a first pressure reduction channel part 161 continuously connected with recess 152, recess 162 disposed on one end side of emitter main body 130 and continuously connected with first pressure reduction channel part 161, and second pressure reduction channel part 163 continuously connected with recess 162. Recess 162 is configured to form a part of a channel of the irrigation liquid in emitter 120.

First pressure reduction channel part 161 is a groove having a zigzag shape in plan view which is formed in one side part of the bottom surface. The zigzag shape is a shape in which projections, each having a nearly triangular prism shape, are alternately disposed along the longitudinal direction from the side surfaces of first pressure reduction channel part 161, for example. In plan view, the projections are disposed such that the tip of each projection does not exceed the central axis between the side surfaces. For example, the length of first pressure reduction channel part 161 is 6.5 mm, the depth of first pressure reduction channel part 161 is 0.5 mm, and the width of the channel of first pressure reduction channel part 161 (the distance between opposite side surfaces at opposite projections) is 0.5 mm.

Recess 162 is a recess formed on the bottom surface, and has a substantially rectangular slender shape in the short direction of emitter 120 in plan view. The depth of recess 162 is, for example, 0.5 mm, and the width of recess 162 is, for example, 1.0 mm.

Second pressure reduction channel part 163 is disposed along the longitudinal direction of emitter main body 130 at a center portion on the bottom surface. Second pressure reduction channel part 163 is formed similarly to first pressure reduction channel part 161. The length of second pressure reduction channel part 163 is, for example, 13 mm. Hole 164 opens at an end of second pressure reduction channel part 163.

The discharge rate adjusting part includes columnar recess 171 formed on the top surface, columnar projection 172 raised from the bottom surface of recess 171, hole 173 opening at the center of projection 172 and communicated with the discharging part, first valve seat part 174 composed of a recessed annular surface slanted toward the edge of hole 173, and groove 175 traversing first valve seat part 174.

In addition, the discharge rate adjusting part includes film 140. Film 140 has flexibility, and is disposed such that it is separated from first valve seat part 174 and can make close contact with first valve seat part 174. Hole 164 opens at the bottom of recess 171. That is, hole 164 communicates between second pressure reduction channel part 163 and recess 171.

First valve seat part 174 is composed of outermost first slanted surface part 174a having a first inclination angle, second slanted surface part 174b disposed adjacently to first slanted surface part 174a on the inner side of first slanted surface part 174a and having a second inclination angle, and third slanted surface part 174c disposed adjacently to second slanted surface part 174b on the inner side of second slanted surface part 174b and having a third inclination angle. The first, second, and third inclination angles increase in this order, and, for example, are 7°, 15°, and 30°, respectively. Accordingly, first valve seat part 174 is composed of an annular surface whose inclination angle discontinuously changes from the top edge to the bottom edge. It is to be noted that the "inclination angle" is the angle of each slanted surface part with respect to a plane orthogonal to the axis of hole 173.

Groove 175 has a constant width and a flat bottom surface. Here, "flat" means that the surface extends along a direction orthogonal to the axis of hole 173. With this configuration, groove 175 is formed on the surface of first valve seat part 174 such that groove 175 traverses first valve seat part 174 and the depth of groove 175 gradually decreases from the top edge toward the bottom edge of first valve seat part 174. The width of groove 175 is, for example, 0.4 mm. In addition, the depth of groove 175 is 0.3 mm at the deepest portion thereof (outer edge (top edge) of first valve seat part 174), and is 0.07 mm at the shallowest portion thereof (inner edge (bottom edge) of first valve seat part 174).

On the bottom surface side of emitter main body 130, the bypass channel part includes third pressure reduction channel part 181 continuously connected with recess 162, and groove 182 continuously connected with third pressure reduction channel part 181 and configured to form a communication channel. Third pressure reduction channel part 181 is formed along the longitudinal direction in the other side part of emitter main body 130. Third pressure reduction channel part 181 is formed similarly to first pressure reduction channel part 161. The length of third pressure reduction channel part 181 is, for example, 14.5 mm.

Groove 182 is continuously connected with an end of third pressure reduction channel part 181, and includes a plurality of columnar projections 183 raised from the bottom groove 182. Hole 184 opens at an end portion of groove 182.

On the top surface side of emitter main body 130, the bypass channel part includes second valve seat part 185 recessed from the top surface, and guide groove 186. Second valve seat part 185 is a cone-shaped depression having a circular shape in plan view. The outer edge of second valve seat part 185 is in contact with recess 171. Second valve seat part 185 includes a bottom surface, and the bottom surface is a plane surface having a circular shape in plan view. With this configuration, second valve seat part 185 has a depth from the top surface of emitter main body 130 to the bottom surface, and the depth of second valve seat part 185 is smaller than the depth from the top surface of emitter main body 130 to the top of first valve seat part 174. Hole 184 opens at the bottom surface. That is, hole 184 communicates between groove 182 and second valve seat part 185.

Guide groove 186 is continuously connected with the outer edge of the bottom surface, thus communicating between second valve seat part 185 and recess 171. The width of guide groove 186 is constant, and is, for example, 0.6 mm. The depth of guide groove 186 from the top surface of emitter main body 130 is constant, and is identical to the depth of second valve seat part 185.

The discharging part includes recess 191 formed on the bottom surface of emitter main body 130, and main-projection 192 and sub-projection 193 raised from the bottom surface of recess 191. The planar shape of recess 191 is a substantially rectangular shape. Hole 173 opens at a center portion of an edge of recess 191 in the short direction of emitter main body 130. That is, hole 173 communicates between recess 171 and recess 191.

Each of main-projection 192 and sub-projection 193 has a height equal to the depth of recess 191 from the bottom surface of emitter main body 130. Main-projection 192 extends from a side surface of recess 191 along the short direction of emitter main body 130, and is disposed at a position overlapping hole 173 as viewed along the longitudinal direction of emitter main body 130. Sub-projection 193 is disposed at a position between an end of main-projection 192 and a side surface of recess 191 without making contact with the end of main-projection 192 or the side surface of recess 191.

In addition, thickness-reducing recess 199 is formed on the top surface of emitter main body 130.

Emitter 120 is configured by turning film 140 about the hinge part, and joining the film 140 to the top surface of emitter main body 130. Various publicly-known methods may be employed to join film 140 to emitter main body 130, and the examples of the methods include welding or fusing of film 140, and bonding with an adhesive agent. When film 140 is joined to emitter main body 130, recess 171 of the discharge rate adjusting part and second valve seat part 185 of the bypass channel part are sealed with film 140 at the upper end edges thereof, and thus a space of the channel for irrigation liquid is formed. In the following description, the portion which seals recess 171 in film 140 is referred to also as first diaphragm part 142 (see FIG. 2A), and the portion which seals second valve seat part 185 in film 140 is referred to also as second diaphragm part 143 (see FIG. 2A).

It is to be noted that hinge part 141 may be removed from emitter 120 after film 140 is joined to emitter main body 130. In addition, film 140 and emitter main body 130 may be separate members, and emitter 120 may be configured by joining such a separated film 140 to emitter main body 130.

Emitter 120 can be disposed at a predetermined position on the inner wall surface of tube 110 by fusing emitter 120 at a desired position thereof at the time of shaping tube 110, for example. In this manner, drip irrigation tube 100 is configured. When emitter 120 is joined to the inner wall surface of tube 110, the bottom surface of emitter main body 130 is sealed with tube 110. As a result, recess 152 of the water intake part serves as a part of a channel of the irrigation liquid in emitter 120, which houses the irrigation liquid past slit 151.

In addition, first pressure reduction channel part 161, recess 162 and second pressure reduction channel part 163 of the pressure reduction channel part serve as the pressure reduction channel for allowing the irrigation liquid received from a water intake part to flow to the discharge rate adjusting part while reducing the pressure of the irrigation liquid. In addition, third pressure reduction channel part 181 of the bypass channel part serves as another pressure reduction channel for allowing the irrigation liquid received from a water intake part to flow to second valve seat part 185 while reducing the pressure of the irrigation liquid, and, groove 182 of the bypass channel part serves as a communication channel that communicates between the other pressure reduction channel and second valve seat part 185. Thus, the bypass channel part serves as a bypass channel that bypasses a part the downstream side of the pressure reduction channel part and communicates between the upstream side of the discharge rate adjusting part and the water intake part.

Further, recess 191 of the discharging part forms a space for housing the irrigation liquid supplied from the discharge rate adjusting part, and main-projection 192 and sub-projection 193 are joined to tube 110 at the tops thereof, thus forming an intrusion preventing part for preventing intrusion of foreign matters into discharging port 112. It is to be noted that hole 173 of the discharge rate adjusting part projection 172 communicates between the pressure reduction channel and the discharging part through recess 171 and hole 164.

Next, flow of irrigation liquid in drip irrigation tube 100 is roughly described. First, irrigation liquid is fed into tube 110. Examples of the irrigation liquid include water, liquid fertilizer, agricultural chemicals and mixtures thereof. The feeding pressure of the irrigation liquid to drip irrigation tube 100 is 0.1 MPa or lower in view of simple implementation of the drip irrigation method and prevention of damaging of tube 110 and emitter 120, for example.

The irrigation liquid in tube 110 is supplied into emitter 120 through the first and third outer grooves of the screen part. Floating matters in the irrigation liquid are captured by the recesses and projections of the screen part, and thus the irrigation liquid from which the floating matters are removed passes through slit 151.

It is to be noted that by forming the first and third outer grooves into shapes whose width increases toward the depth side such that the recesses and projections are configured in a so-called wedge wire structure, it is possible to further suppress the liquid pressure drop at the time of intake of the irrigation liquid into emitter 120.

The irrigation liquid supplied into emitter 120 passes through the pressure reduction channel of first pressure reduction channel part 161 while its pressure being reduced. Then, on one hand, the irrigation liquid passes through the pressure reduction channel of second pressure reduction channel part 163 while its pressure being reduced and is supplied to recess 171 of the discharge rate adjusting part through hole 164, and on the other hand, the irrigation liquid passes through another pressure reduction channel of third pressure reduction channel part 181 while its pressure being reduced, and is supplied to second valve seat part 185 through the communication channel and hole 184.

The irrigation liquid supplied to recess 171 of the discharge rate adjusting part fills recess 171, and goes over first valve seat part 174 of projection 172 so as to be supplied to the discharging part through groove 175 and hole 173. Meanwhile, the irrigation liquid supplied to second valve seat part 185 is supplied to recess 171 through guide groove 186, and is finally supplied to the discharging part through hole 173.

The irrigation liquid supplied to the discharging part is discharged to the outside of tube 110 from the discharging port of tube 110 that opens to recess 191.

Figure 6A:
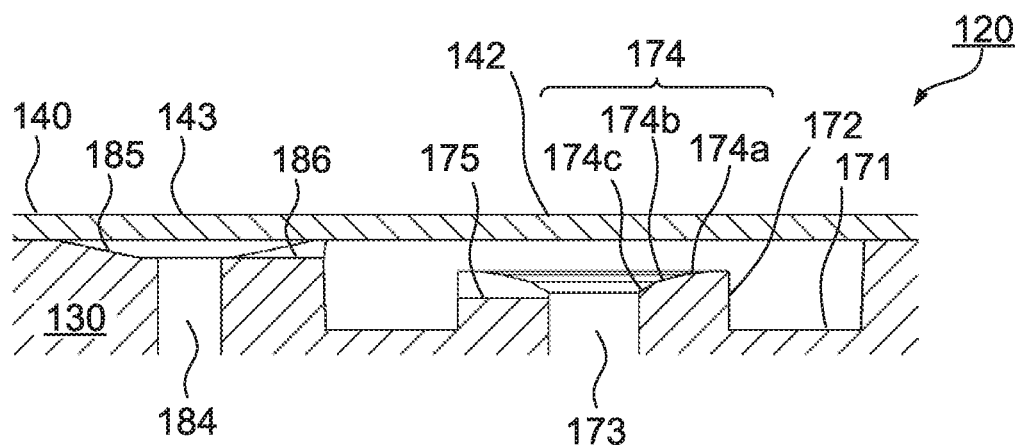
FIG. 6A schematically illustrates a part of a cross section of the emitter according to the first embodiment taken along line C-C of FIG. 3A in the case where the outer liquid pressure is sufficiently low, and FIG. 6B schematically illustrates a part of a cross section of the emitter taken along line C-C of FIG. 3A in the case where the outer liquid pressure is equal to or greater than a first set value.
Figure 6B:
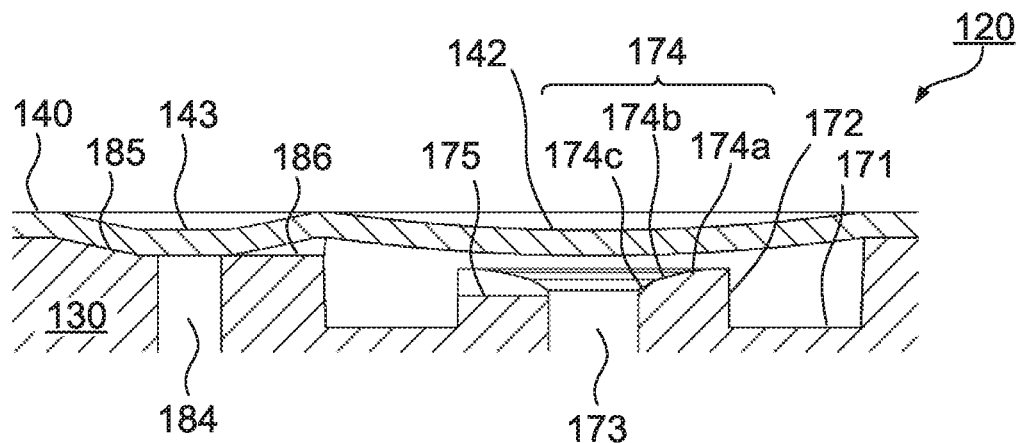
Figure 7A:
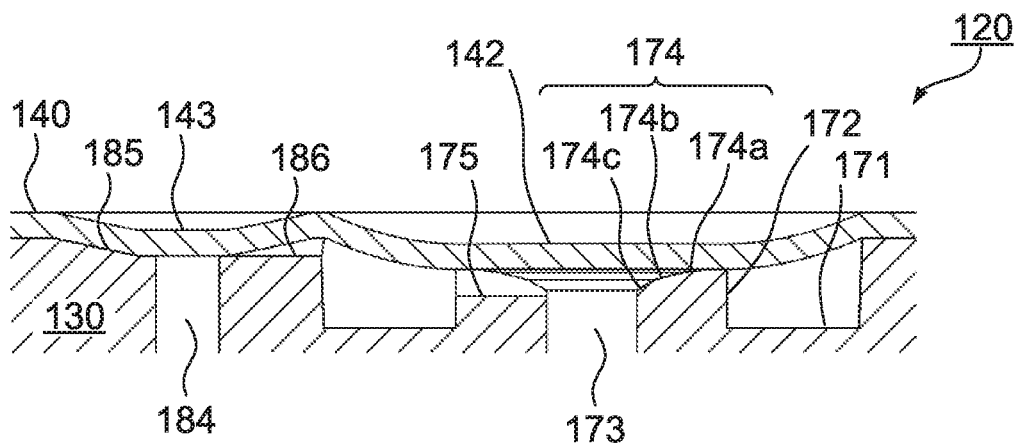
FIG. 7A schematically illustrates a part of a cross section of the emitter according to the first embodiment taken along line C-C of FIG. 3A in the case where the outer liquid pressure is equal to or greater than a second set value, FIG. 7B schematically illustrates a part of a cross section of the emitter taken along line C-C of FIG. 3A in the case where the outer liquid pressure is equal to or greater than a third set value, and FIG. 7C schematically illustrates a part of a cross section of the emitter taken along line C-C of FIG. 3A in the case where the outer liquid pressure is equal to or greater than a fourth set value.
Figure 7B:
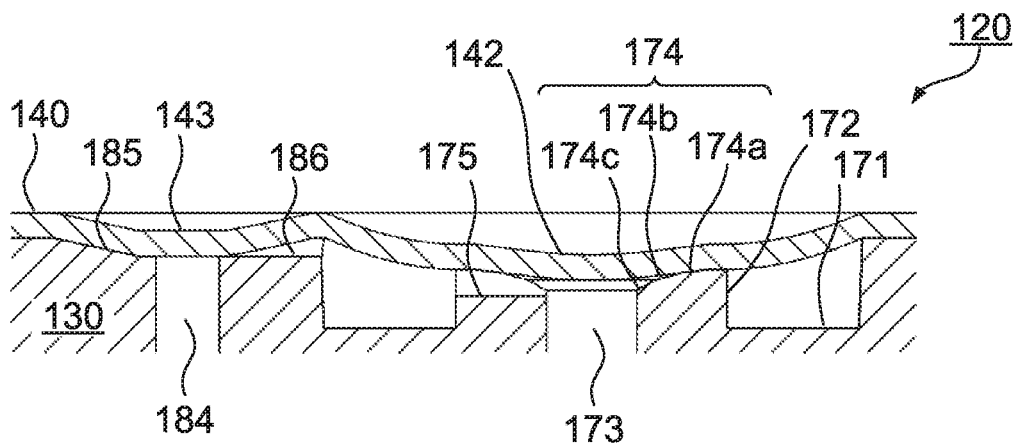
Figure 7C:
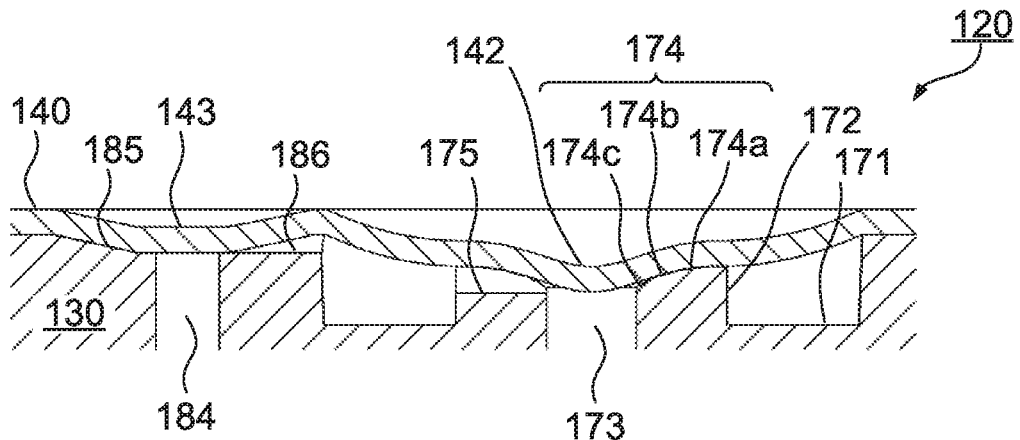

Next, the control of the flow rate of the irrigation liquid in the bypass channel and the discharge rate adjusting part under the outer liquid pressure is described. FIG. 6A schematically illustrates a part of a cross section of emitter 120 taken along line C-C of FIG. 3A in the case where the outer liquid pressure is sufficiently low, and FIG. 6B schematically illustrates a part of a cross section of emitter 120 taken along line C-C of FIG. 3A in the case where the outer liquid pressure is equal to or greater than a first set value. In addition, FIG. 7A schematically illustrates a part of a cross section of emitter 120 taken along line C-C of FIG. 3A in the case where the outer liquid pressure is equal to or greater than a second set value, FIG. 7B schematically illustrates a part of a cross section of emitter 120 taken along line C-C of FIG. 3A in the case where the outer liquid pressure is equal to or greater than a third set value, and FIG. 7C schematically illustrates a part of a cross section of emitter 120 taken along line C-C of FIG. 3A in the case where the outer liquid pressure is equal to or greater than a fourth set value.

When the outer liquid pressure is sufficiently low (for example, 0.01 MPa), first diaphragm part 142 and second diaphragm part 143 are slightly deflected or neither of them is deflected, and, as illustrated in FIG. 6A, projection 172 and hole 173 of the discharge rate adjusting part, and hole 184 of the bypass channel are open. Accordingly, both the irrigation liquid from the pressure reduction channel and the irrigation liquid from the bypass channel are supplied to recess 171 of the discharge rate adjusting part, and the liquid is supplied to the discharging part from hole 173 and discharged from discharging port 112. The irrigation liquid from the bypass channel is smoothly supplied from second valve seat part 185 to recess 171 through guide groove 186. When the outer liquid pressure increases, first diaphragm part 142 and second diaphragm part 143 of film 140 under the outer liquid pressure are gradually deflected and brought closer to projection 172 and second valve seat part 185.

When the outer liquid pressure increases to the first set value (for example, 0.03 MPa), both first diaphragm part 142 and second diaphragm part 143 are largely deflected. In the bypass channel, second valve seat part 185 is located at a position shallower than first valve seat part 174 of the discharge rate adjusting part, and accordingly, second diaphragm part 143 makes close contact with second valve seat part 185 so as to seal hole 184 as illustrated in FIG. 6B. In this manner, the bypass channel is closed and supply of the irrigation liquid from the bypass channel to recess 171 is stopped. As a result, only the irrigation liquid from the pressure reduction channel is supplied to recess 171, and the irrigation liquid is discharged from discharging port 112 only by the rate of the irrigation liquid supplied from the pressure reduction channel.

In the discharge rate adjusting part, first diaphragm part 142 is brought closer to first valve seat part 174 but does not make contact with first valve seat part 174 as illustrated in FIG. 6B. Accordingly, when the outer liquid pressure is at the first set value, only the adjustment of the flow rate of the irrigation liquid by closing the bypass channel is performed as described above. When the outer liquid pressure further increases from the first set value, the flow rate of the irrigation liquid in the pressure reduction channel increases, and the flow rate of the irrigation liquid which enters hole 173 from a space between first diaphragm part 142 and first valve seat part 174 increases.

When the outer liquid pressure increases to the second set value (for example, 0.05 MPa), first diaphragm part 142 is more largely deflected, and in addition, since first slanted surface part 174a is located at the highest position in first valve seat part 174, first diaphragm part 142 makes close contact with first slanted surface part 174a of first valve seat part 174, and groove 175 forms a channel surrounded by groove 175 and first diaphragm part 142 (which is referred to also as "fine channel") as illustrated in FIG. 7A. The irrigation liquid in recess 171 passes through the fine channel, and reaches hole 173.

First slanted surface part 174a is slanted downward toward hole 173, and accordingly, as the outer liquid pressure increases, first diaphragm part 142 makes contact with first slanted surface part 174a more closely, and the length of the fine channel gradually increases, and, the size of the opening of the channel on hole 173 side gradually decreases. In this manner, when the outer liquid pressure is equal to or greater than the second set value, the flow rate of the irrigation liquid from the discharge rate adjusting part is controlled at the flow rate corresponding to the opening area of the fine channel, and finally, only the irrigation liquid having the flow rate corresponding to the opening area is discharged from discharging port 112.

Incidentally, when the outer liquid pressure further increases from the second set value, the rate of the irrigation liquid which enters emitter 120 increases, the flow rate of the irrigation liquid into recess 171 increases, and the rate of the irrigation liquid to be introduced into hole 173 increases. Meanwhile, the opening area of the fine channel decreases at a speed corresponding to the increase in outer liquid pressure and the first inclination angle of first slanted surface part 174a. As a result, the increase in flow rate of the irrigation liquid in response to the increase in outer liquid pressure is offset by the reduction in flow rate of the irrigation liquid in response to the reduction in opening area of the fine channel at first slanted surface part 174a. Accordingly, even when the outer liquid pressure further increases from the second set value, the flow rate of the irrigation liquid which is supplied to hole 173 is maintained at a desired flow rate, and thus the irrigation liquid is discharged from discharging port 112 at the desired flow rate.

When the outer liquid pressure increases to the third set value (for example, 0.16 MPa), first diaphragm part 142 is further largely deflected, and brought into close contact with first valve seat part 174 as illustrated in FIG. 7B. Since groove 175 is formed on the surface of first valve seat part 174, the irrigation liquid in recess 171 reaches hole 173 via groove 175. The flow rate of the irrigation liquid from the discharge rate adjusting part is adjusted to an allowable rate for passing through groove 175 in accordance with the opening area of groove 175 sealed with first diaphragm part 142, and finally, the irrigation liquid is discharged from discharging port 112 only by the rate of the irrigation liquid which passes through groove 175.

When the outer liquid pressure further increases from the third set value, the length of the fine channel is further increased, and the opening area of the fine channel is further reduced. Since the second inclination angle of second slanted surface part 174b is greater than the first inclination angle of first slanted surface part 174a, the reduction speed of the opening area accordingly increases. As a result, the increase in flow rate of the irrigation liquid in response to the further increase in outer liquid pressure is offset by the reduction in flow rate of the irrigation liquid in response to the further reduction in opening area of the fine channel at second slanted surface part 174b. Accordingly, even when the outer liquid pressure further increases from the third set value, the flow rate of the irrigation liquid which is supplied to hole 173 is maintained at a desired flow rate, and thus the irrigation liquid is discharged from discharging port 112 at the desired flow rate.

When the outer liquid pressure increases to the fourth set value (for example, 0.2 MPa), first diaphragm part 142 is further pushed toward first valve seat part 174, and brought into close contact with third slanted surface part 174c more closely as illustrated in FIG. 7C. Then, when the outer liquid pressure further increases from the fourth set value, the length of the fine channel is further increased, and the opening area of the fine channel is further reduced. Since the third inclination angle of third slanted surface part 174c is yet greater than the second inclination angle of second slanted surface part 174b, the reduction speed of the opening area accordingly further increases. As a result, the increase in flow rate of the irrigation liquid in response to the further increase in outer liquid pressure is offset by the reduction in flow rate of the irrigation liquid in response to the further reduction in opening area of the fine channel at third slanted surface part 174c. Accordingly, even when the outer liquid pressure further increases from the fourth set value, the flow rate of the irrigation liquid which is supplied to hole 173 is maintained at a desired flow rate, and thus the irrigation liquid is discharged from discharging port 112 at the desired flow rate.

When first diaphragm part 142 makes close contact with the entirety of third slanted surface part 174c, the opening area of the fine channel is minimized. That is, the valve seat part is a portion which can make close contact with the film under the outer liquid pressure. Thereafter, when the outer liquid pressure further increases, the flow rate of the irrigation liquid in the pressure reduction channel further increases, and the flow rate of the irrigation liquid which passes through the fine channel gradually and slightly increases.

In this manner, emitter 120 discharges from discharging port 112 the irrigation liquid whose pressure is sufficiently low by the rate of the irrigation liquid which passes through the bypass channel and the pressure reduction channel, and, emitter 120 discharges from discharging port 112 the irrigation liquid whose pressure is sufficiently high by the rate of the irrigation liquid which passes through groove 175. The opening area of the fine channel decreases at a speed corresponding to the first inclination angle when first diaphragm part 142 makes close contact with first slanted surface part 174a, at a speed corresponding to the second inclination angle when first diaphragm part 142 makes close contact with second slanted surface part 174b, and, at a speed corresponding to the third inclination angle when first diaphragm part 142 makes close contact with third slanted surface part 174c. That is, emitter 120 includes a mechanism that suppresses, three times in the discharge rate adjusting part or four times when the bypass channel is included, the increase in flow rate of the irrigation liquid associated with the increase in outer liquid pressure. Accordingly, emitter 120 can handle higher outer liquid pressure to adjust the discharge rate of the irrigation liquid to a desired rate.

As is clear from the above description, emitter 120 is an emitter that is joined at a position corresponding to discharging port 112 of the inner wall surface of tube 110 and configured to quantitatively discharge the irrigation liquid in tube 110 to the outside of tube 110 from discharging port 112. Emitter 120 includes a water intake part for intake of the irrigation liquid in tube 110; a pressure reduction channel part for forming a pressure reduction channel that allows the irrigation liquid received at the water intake part to flow therethrough while reducing the pressure of the irrigation liquid; a discharge rate adjusting part for controlling the flow rate of the irrigation liquid supplied from the pressure reduction channel in accordance with the pressure of the irrigation liquid in tube 110; and a discharging part configured to house the irrigation liquid supplied from the discharge rate adjusting part, and configured to face discharging port 112. Emitter 120 further includes the discharge rate adjusting part includes hole 173 for communicating between the pressure reduction channel and the discharging part; first valve seat part 174 composed of a recessed annular surface surrounding the edge of hole 173 and slanted toward the edge; groove 175 formed on the surface of first valve seat part 174 to traverse first valve seat part 174 in which the depth of groove 175 from the surface of first valve seat part 174 gradually decreases from the top edge toward the bottom edge of first valve seat part 174; and film 140 having flexibility and disposed separately from first valve seat part 174 at a position where the film is allowed to gradually make close contact with first valve seat part 174 from the top edge toward the bottom edge when the outer liquid pressure is equal to or greater than a set value. Accordingly, the irrigation liquid can be quantitatively discharged even when the pressure of the irrigation liquid is low, and fluctuations of the discharge rate of the irrigation liquid can be suppressed when the pressure of the irrigation liquid is high.

In addition, the configuration in which the recessed annular surface is composed of an annular surface whose inclination angle discontinuously changes from the top edge toward the bottom edge is further advantageous from the viewpoint of suppressing the flow rate of the irrigation liquid under high pressure and simply forming such a flow rate adjustment mechanism.

In addition, the configuration in which emitter 120 further includes a bypass channel part for forming a bypass channel that bypasses a part or all of the pressure reduction channel part and communicates between the water intake part and the upstream side of the discharge rate adjusting part, and the bypass channel part includes second valve seat part 185 that can make close contact with film 140 under the pressure of the irrigation liquid in tube 110 to close the bypass channel is further advantageous from the viewpoint of increasing the discharge rate of the irrigation liquid under low pressure.

In addition, the configuration in which the bypass channel part further includes guide groove 186 for guiding the irrigation liquid supplied to second valve seat part 185 to the upstream side of the discharge rate adjusting part is further advantageous from the viewpoint of smoothly supplying the irrigation liquid from the bypass channel to the discharge rate adjusting part.

In addition, the configuration in which the bypass channel part further includes another pressure reduction channel part (third pressure reduction channel part 181) for forming another pressure reduction channel that allows irrigation liquid to flow toward second valve seat part 185 while reducing the pressure of the irrigation liquid is further advantageous from the viewpoint of handling higher outer liquid pressure to discharge irrigation liquid.

In addition, the configuration in which the water intake part includes the screen part including slit 151 that opens to the interior of tube 110 is further advantageous from the viewpoint of preventing clogging of the channel in emitter 120 with floating matters in the irrigation liquid.

In addition, the configuration in which the discharging part includes an intrusion preventing part for preventing intrusion of foreign matters into discharging port 112 is further advantageous from the viewpoint of preventing closing of the channel in emitter 120 and damaging of emitter 120 due to intrusion of the foreign matter.

In addition, the configuration in which emitter 120 is integrally molded with a resin material having flexibility is further advantageous from the viewpoint of enhancing the productivity of emitter 120 by facilitating assembly and increasing assembly precision.

In addition, drip irrigation tube 100 includes tube 110 including discharging port 112 for discharging irrigation liquid, and emitter 120 joined at a position corresponding to discharging port 112 on the inner wall surface of tube 110. Accordingly, the irrigation liquid can be quantitatively discharged even when the pressure of the irrigation liquid is low, and fluctuations of the discharge rate of the irrigation liquid can be suppressed when the pressure of the irrigation liquid is high.

Second Embodiment

Figure 8A:
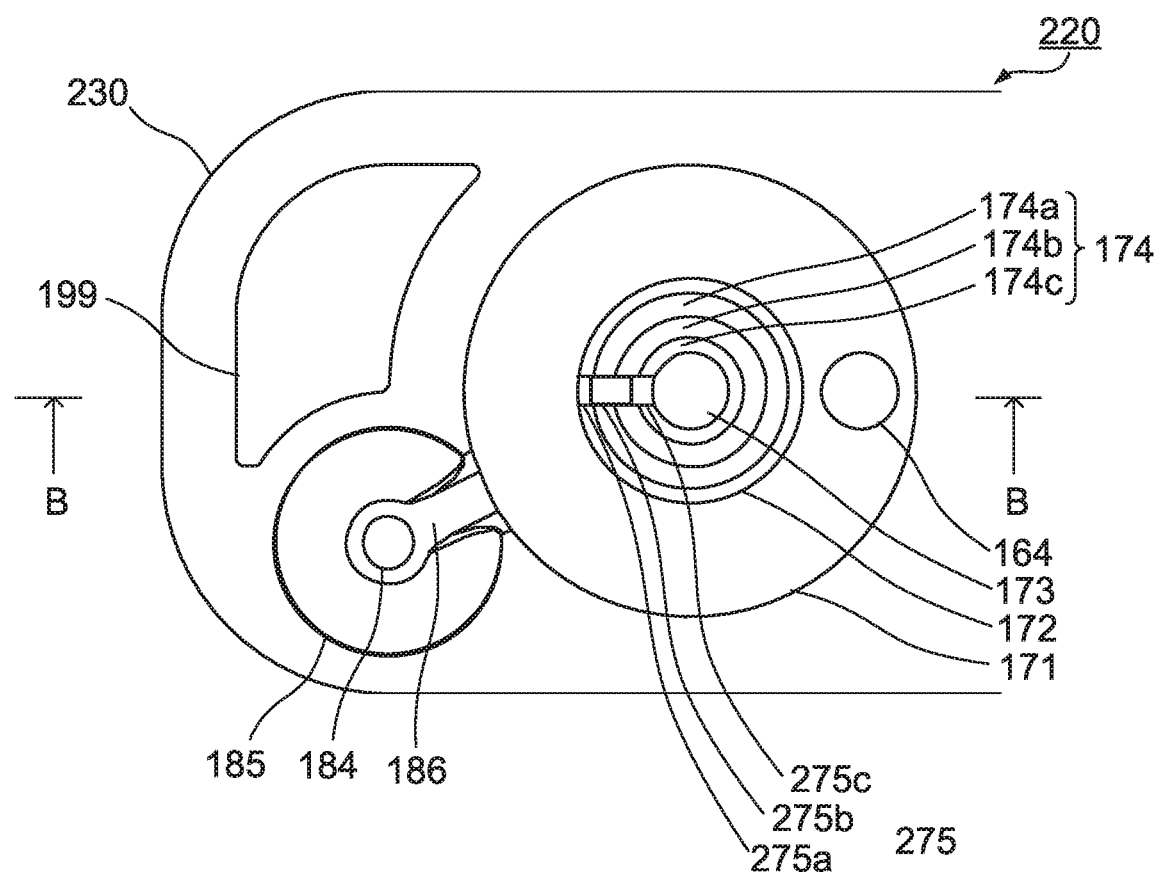
FIG. 8A is a plan view of a discharge rate adjusting part of a second embodiment of the present invention.
Figure 8B:
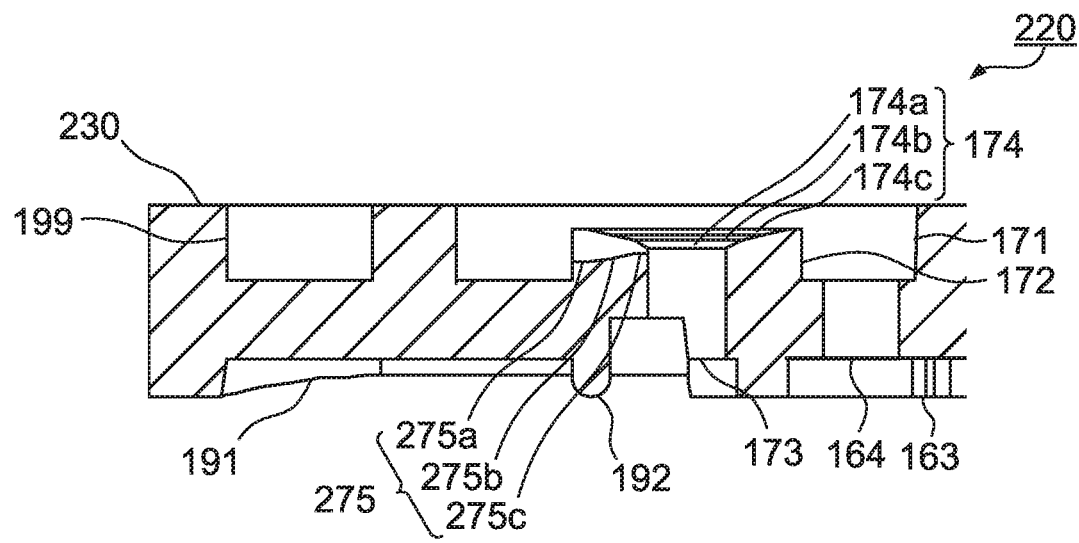
FIG. 8B is a cross-sectional view of the discharge rate adjusting part taken along line B-B of FIG. 8A.

FIG. 8A and FIG. 8B illustrate emitter 220 according to the second embodiment of the present invention. FIG. 8A is a plan view of a discharge rate adjusting part in emitter main body 230 of emitter 220, and FIG. 8B is a cross-sectional view of the discharge rate adjusting part taken along line B-B of FIG. 8A. As illustrated in FIG. 8A and FIG. 8B, the configuration of emitter 220 is roughly the same as that of emitter 120 except that emitter 220 includes groove 275 on its bottom surface in place of flat groove 175. The bottom surface of groove 275 is composed of two-stage plane surfaces and a tapered surface connecting the two-stage plane surfaces. Specifically, the bottom surface of groove 275 is composed of first plane surface 275a located at an outermost and lowest position, tapered surface 275b that is slanted upward from first plane surface 275a, and second plane surface 275c continuously connected with tapered surface 275b.

In emitter 220, the degree of reduction in opening area of the fine channel along with the gradual extension of the fine channel defined by groove 275 and first diaphragm part 142 is large in comparison with emitter 120. Accordingly, in addition to the advantage of the first embodiment, emitter 220 is further advantageous from the viewpoint of suppressing the discharge rate of the irrigation liquid under high pressure.

Third Embodiment

Figure 9A:
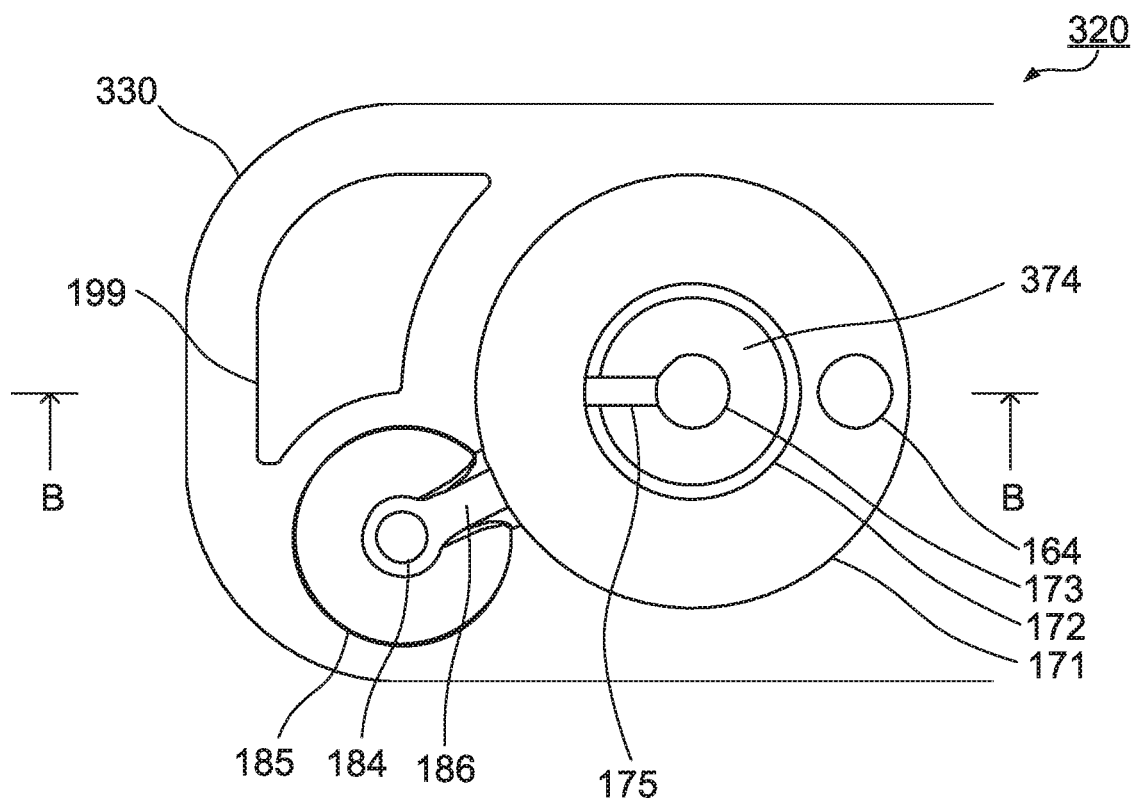
FIG. 9A is a plan view of a discharge rate adjusting part of a third embodiment of the present invention.
Figure 9B:
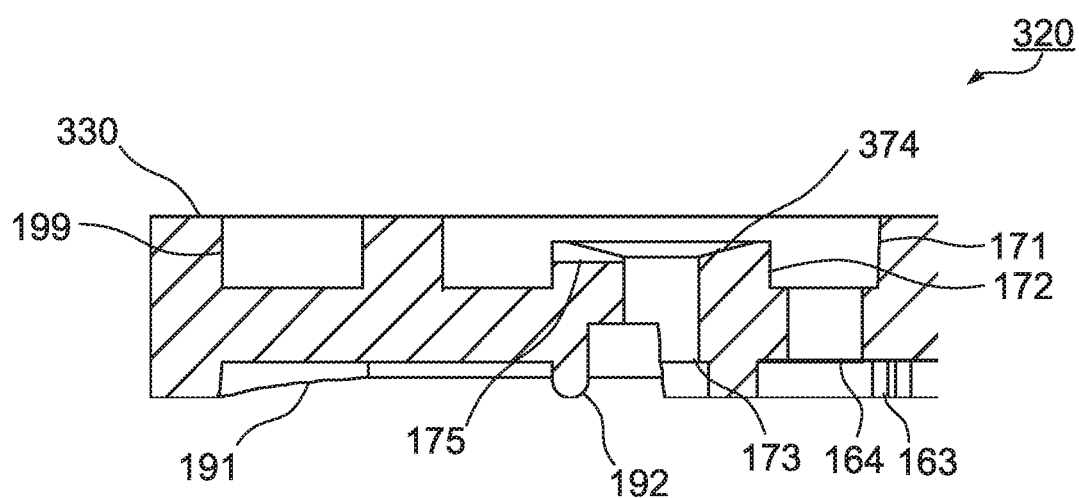
FIG. 9B is a cross-sectional view of the discharge rate adjusting part taken along line B-B of FIG. 9A.

FIG. 9A and FIG. 9B illustrate emitter 320 according to the third embodiment of the present invention. FIG. 9A is a plan view of a discharge rate adjusting part of emitter main body 330 of emitter 320, and FIG. 9B is a cross-sectional view of the discharge rate adjusting part taken along line B-B of FIG. 9A. As illustrated in FIG. 9A and FIG. 9B, the configuration of emitter 320 is roughly the same as that of emitter 120 except that emitter 320 includes first valve seat part 374 composed of a single tapered surface in place of first valve seat part 174. First valve seat part 374 is formed in a tapered surface which is a straight line slanted downward from the top edge (outer edge) toward the bottom edge (hole 173) of first valve seat part 374 as viewed in cross section.

In emitter 320, the degree of reduction in opening area of a fine channel defined by groove 175 and first diaphragm part 142 along with the gradual extension of the fine channel is constant. Accordingly, emitter 320 provides the same effect as that of the first embodiment except for the effect of suppressing the flow rate of the irrigation liquid under high pressure with first valve seat part 174, and is further advantageous from the viewpoint of simply forming the discharge rate adjusting part.

Fourth Embodiment

Figure 10A:
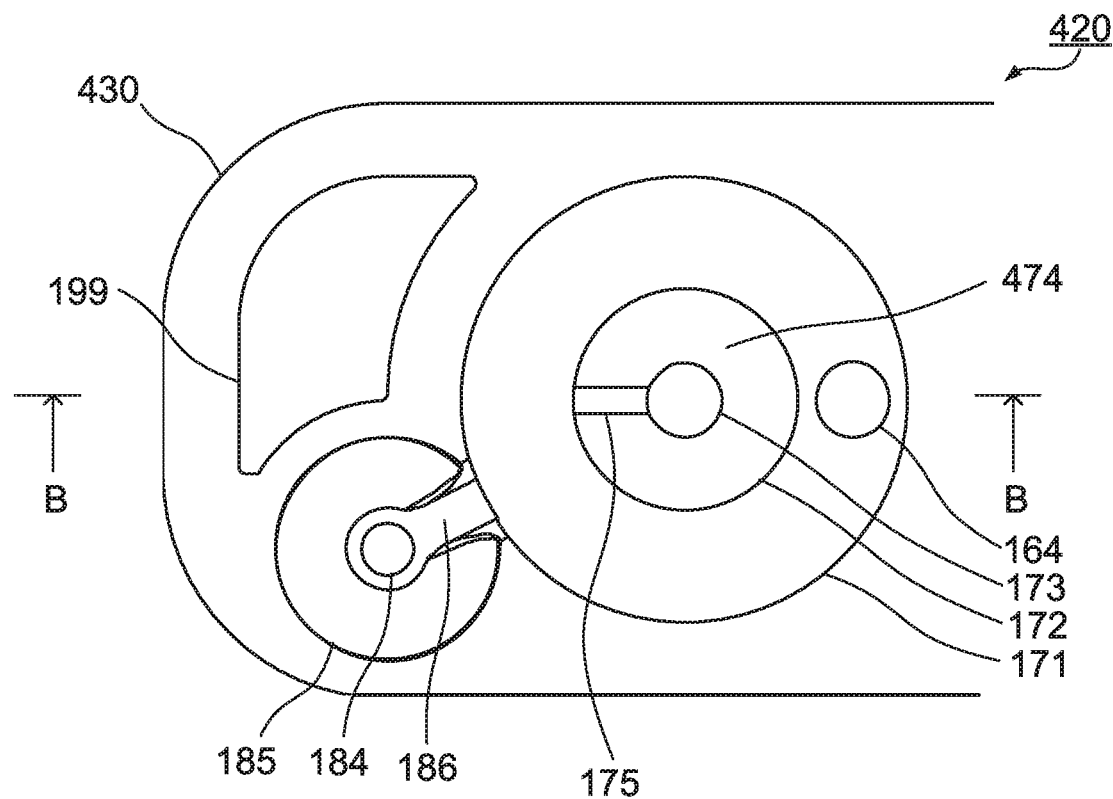
FIG. 10A is a plan view of a discharge rate adjusting part of a fourth embodiment of the present invention.
Figure 10B:
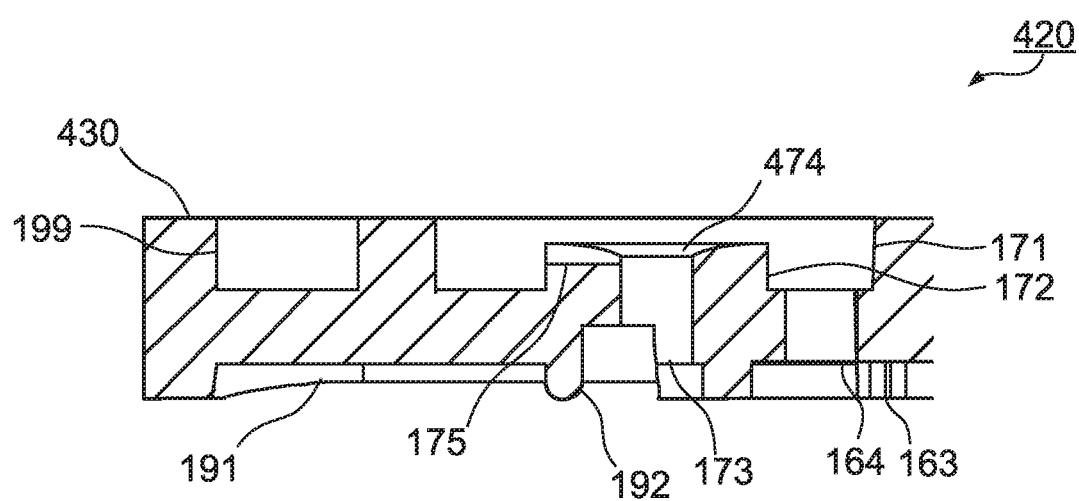
FIG. 10B is a cross-sectional view of the discharge rate adjusting part taken along line B-B of FIG. 10A.

FIG. 10A and FIG. 10B illustrate emitter 420 according to the fourth embodiment of the present invention. FIG. 10A is a plan view of a discharge rate adjusting part of emitter main body 430 of emitter 420, and FIG. 10B is a cross-sectional view of the discharge rate adjusting part taken along line B-B of FIG. 10A. As illustrated in FIG. 10A and FIG. 10B, the configuration of emitter 420 is roughly the same as that of emitter 120 except that emitter 420 includes first valve seat part 474 composed of a single annular curved surface in place of first valve seat part 174. First valve seat part 474 is formed of an annular curved surface whose cross-sectional shape is an elliptical arc in which an inclination angle, which is an angle between the tangent to the cross-sectional shape and a plane orthogonal to the axis of hole 173, gradually increases from the top edge (outer edge) side toward the bottom edge (hole 173) side of first valve seat part 474.

In emitter 420, the reduction in opening area of the fine channel defined by groove 175 and first diaphragm part 142 along with the gradual extension of the fine channel is further smooth. Accordingly, emitter 420 provides the same effect as that of the first embodiment, and is further advantageous from the viewpoint of suppressing variations in adjustment of the discharge rate by the discharge rate adjusting part.

Fifth Embodiment

Figure 11A:
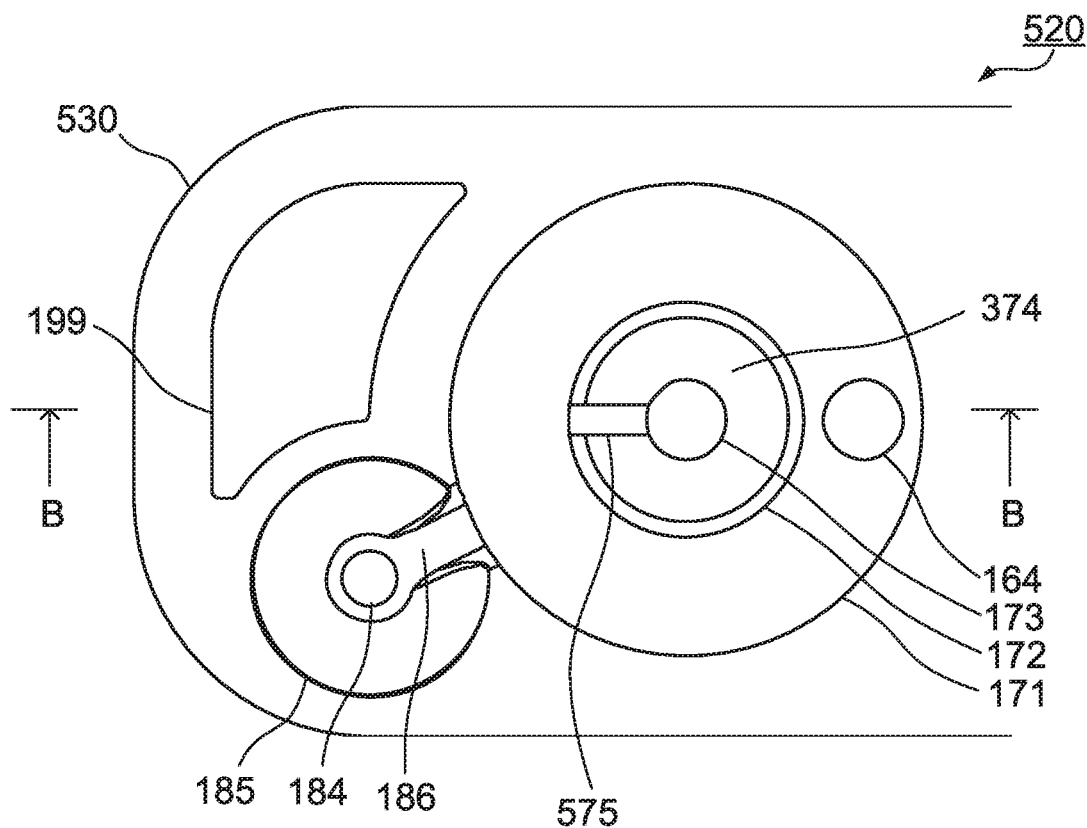
FIG. 11A is a plan view of a discharge rate adjusting part of a fifth embodiment of the present invention.
Figure 11B:
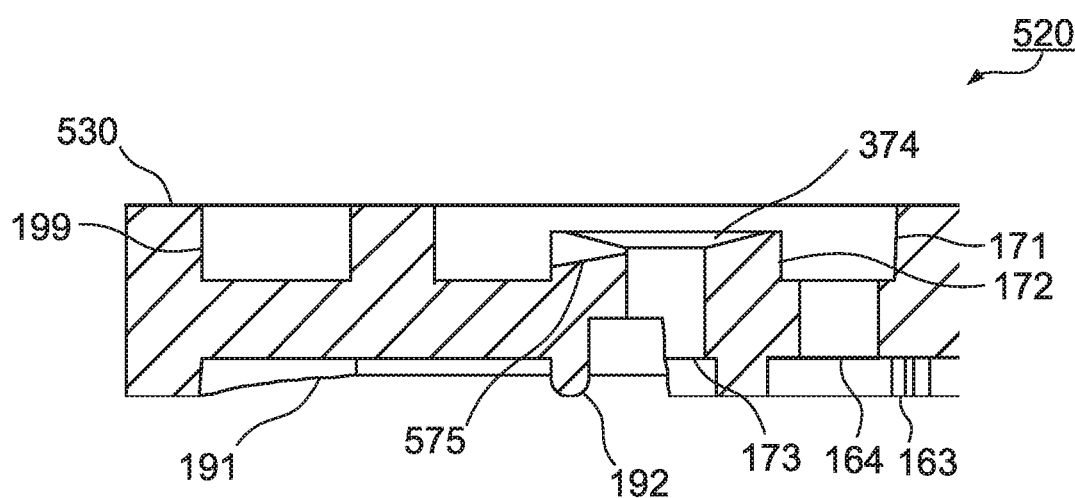
FIG. 11B is a cross-sectional view of the discharge rate adjusting part taken along line B-B of FIG. 11A.

FIG. 11A and FIG. 11B illustrate emitter 520 according to the fifth embodiment of the present invention. FIG. 11A is a plan view of a discharge rate adjusting part of emitter main body 530 of emitter 520, and FIG. 11B is a cross-sectional view of the discharge rate adjusting part taken along line B-B of FIG. 11A. As illustrated in FIG. 11A and FIG. 11B, the configuration of emitter 520 is roughly the same as that of emitter 320 except that emitter 520 includes groove 575 having a tapered bottom surface in place of groove 175. The bottom surface of groove 575 is formed of a tapered surface whose cross-sectional shape is a straight line slanted upward from the outer (recess 171) side toward the inner (hole 173) side of projection 172.

In comparison with emitter 320, emitter 520 can increase the degree of reduction in opening area of the fine channel along with the gradual extension of the fine channel defined by groove 575 and first diaphragm part 142. Accordingly, emitter 520 provides an effect similar to the effect of the third embodiment, and is further advantageous from the viewpoint of suppressing the discharge rate of the irrigation liquid under high pressure.

Sixth Embodiment

Figure 12A:
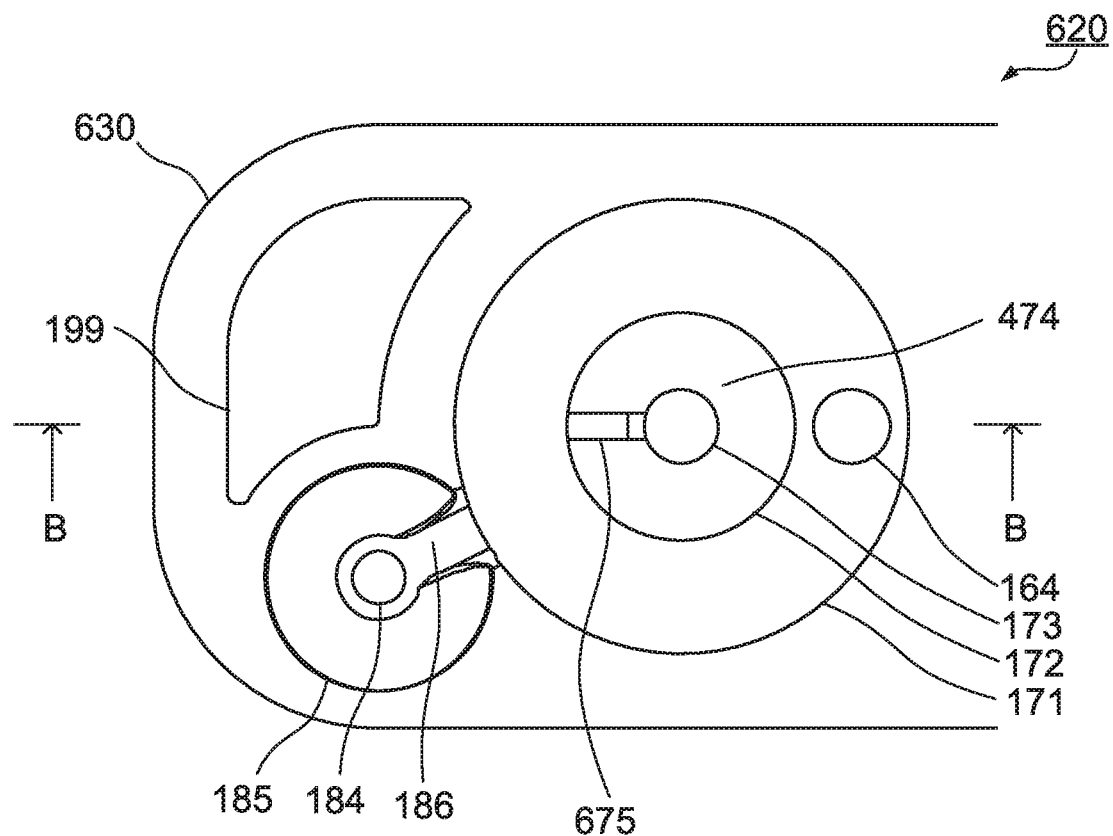
FIG. 12A is a plan view of a discharge rate adjusting part of a sixth embodiment of the present invention.
Figure 12B:
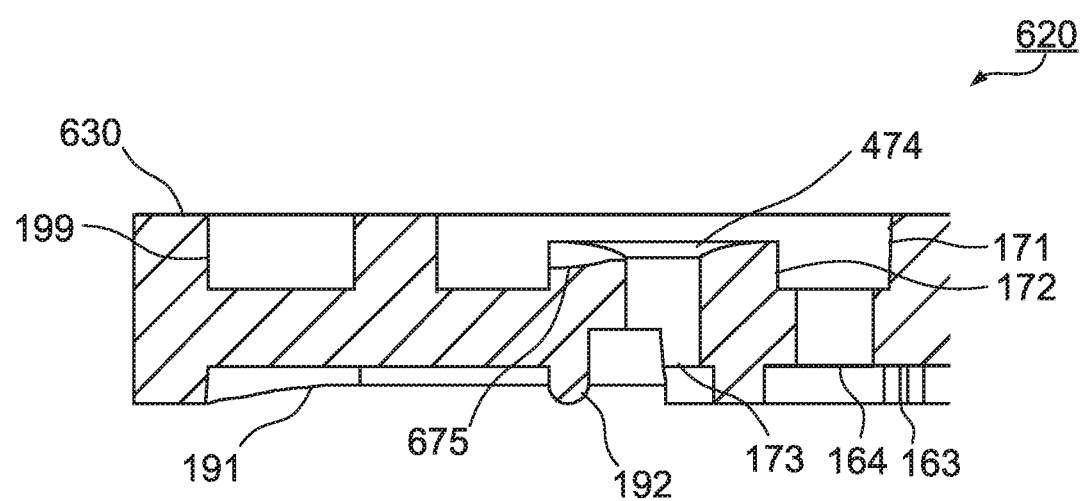
FIG. 12B is a cross-sectional view of the discharge rate adjusting part taken along line B-B of FIG. 12A.

FIG. 12A and FIG. 12B illustrate emitter 620 according to the sixth embodiment of the present invention. FIG. 12A is a plan view of a discharge rate adjusting part of emitter main body 630 of emitter 620, and FIG. 12B is a cross-sectional view of the discharge rate adjusting part taken along line B-B of FIG. 12A. As illustrated in FIG. 12A and FIG. 12B, the configuration of emitter 620 is roughly the same as that of emitter 420 except that emitter 620 includes groove 675. The bottom surface of groove 675 is formed of a curved surface whose cross-sectional shape is an elliptical arc in which an inclination angle, which is an angle between the tangent to the cross-sectional shape and a plane orthogonal to the axis of hole 173, gradually increases from the outer (recess 171) side toward the inner (hole 173) side of projection 172.

In emitter 620, the reduction in opening area of the fine channel defined by groove 675 and first diaphragm part 142 along with the gradual extension of the fine channel is further smooth, and further significant. Accordingly, emitter 620 provides the same effect as that of the effect of the fourth embodiment, and is further advantageous from the viewpoint of smoothly suppressing the discharge rate of the irrigation liquid under high pressure.

Seventh Embodiment

Figure 13A:
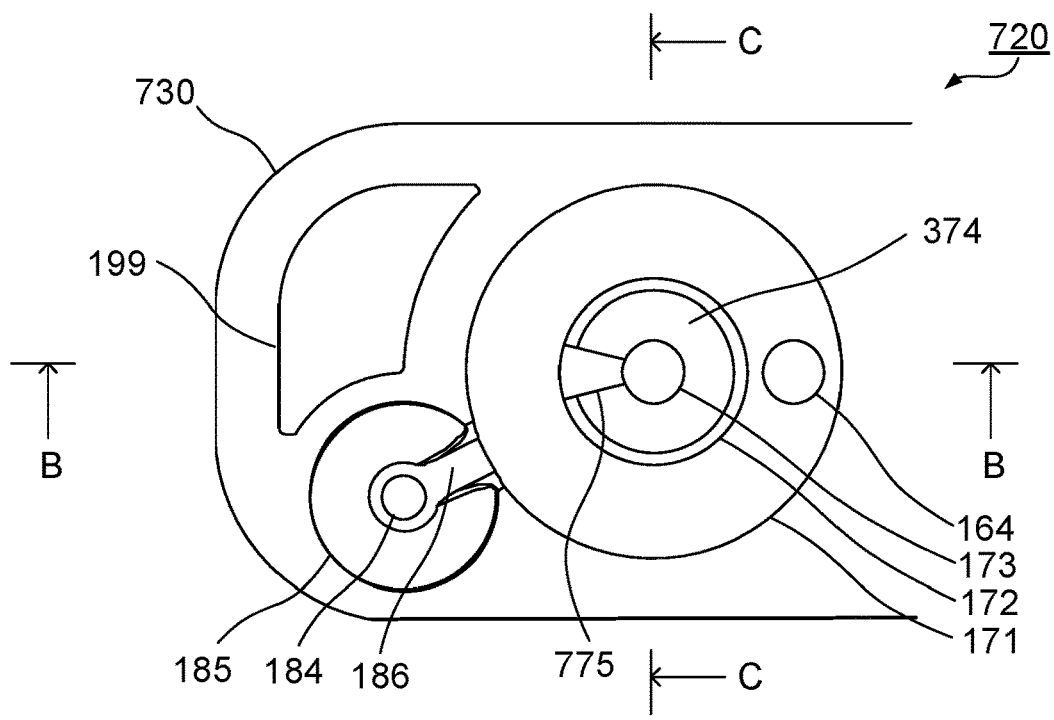
FIG. 13A is a plan view of a discharge rate adjusting part of a seventh embodiment of the present invention.
Figure 13B:
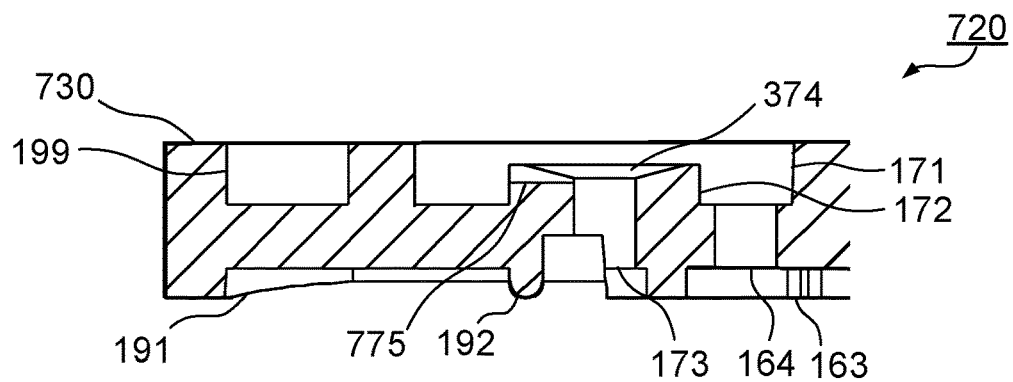
FIG. 13B is a cross-sectional view of the discharge rate adjusting part taken along line B-B of FIG. 13A.
Figure 13C:
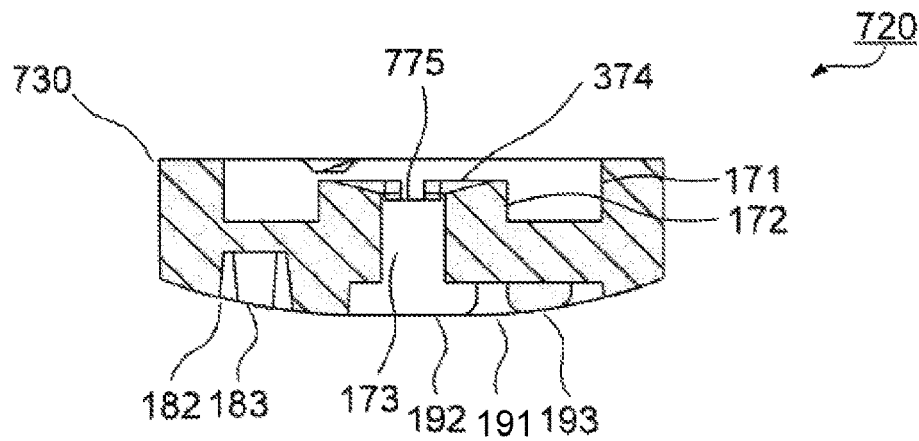
FIG. 13C is a cross-sectional view of the discharge rate adjusting part taken along line C-C of FIG. 13A.

FIG. 13A to FIG. 13C illustrate emitter 720 according to the seventh embodiment of the present invention. FIG. 13A is a plan view of a discharge rate adjusting part of emitter main body 730 of emitter 720, FIG. 13B is a cross-sectional view of the discharge rate adjusting part taken along line B-B of FIG. 13A, and FIG. 13C is a cross-sectional view of the discharge rate adjusting part taken along line C-C of FIG. 13A. As illustrated in FIG. 13A to FIG. 13C, the configuration of emitter 720 is roughly the same as that of emitter 320 except that emitter 720 includes groove 775. Groove 775 has a fan shape in plan view that expands outward from hole 173 side. The bottom surface of groove 775 is flat, and the cross-sectional shape of groove 775 is a rectangular shape.

In emitter 720, the degree of reduction in opening area of the fine channel along with the gradual extension of the fine channel defined by groove 775 and first diaphragm part 142 can be increased in comparison with emitter 320, and even with emitter 520. Accordingly, emitter 720 provides an effect similar to the effect of the fifth embodiment, and is further advantageous from the viewpoint of suppressing the discharge rate of the irrigation liquid under high pressure.

Eighth Embodiment

Figure 14A:
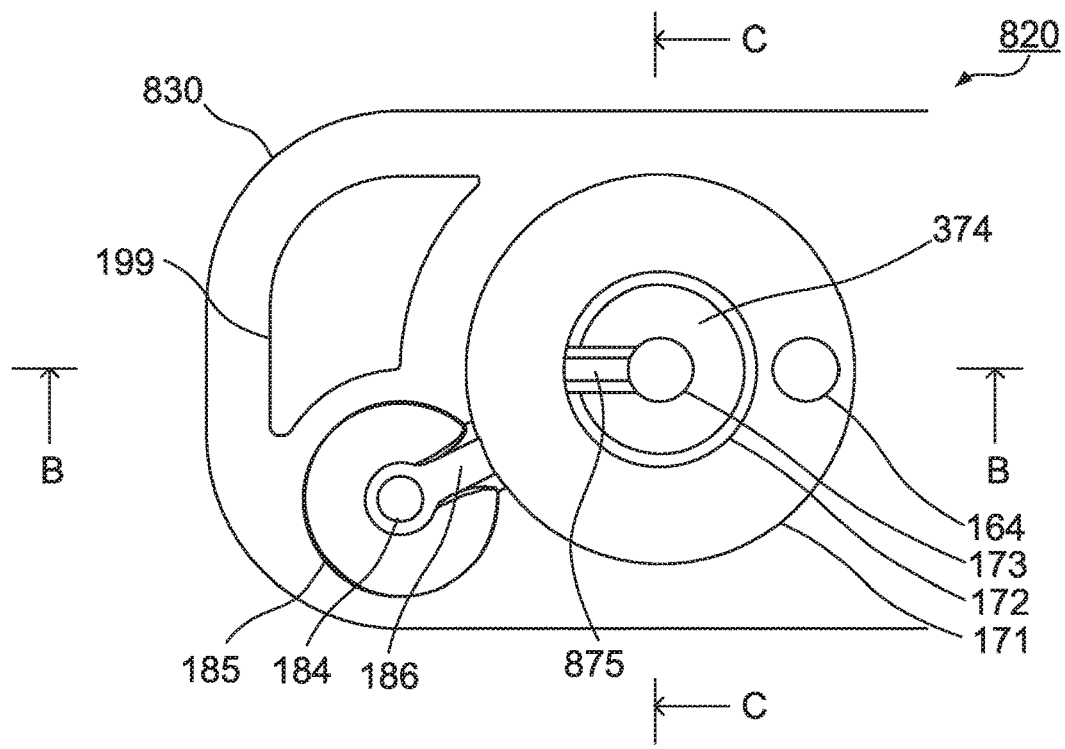
FIG. 14A is a plan view of a discharge rate adjusting part of an eighth embodiment of the present invention.
Figure 14B:
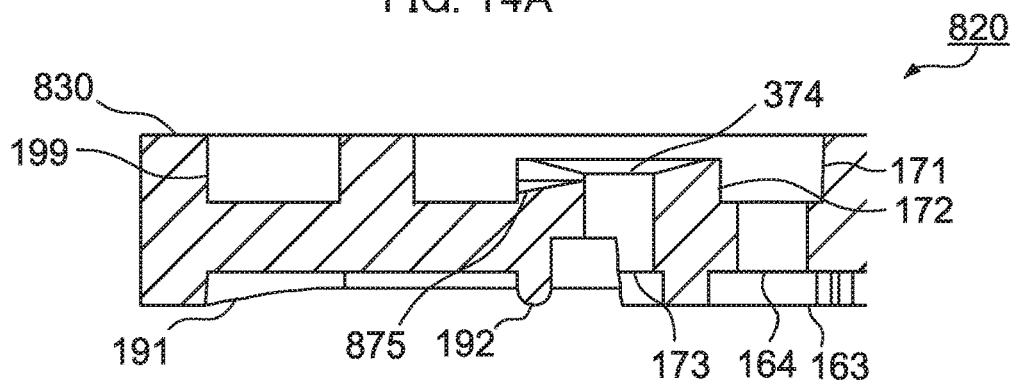
FIG. 14B is a cross-sectional view of the discharge rate adjusting part taken along line B-B of FIG. 14A.
Figure 14C:
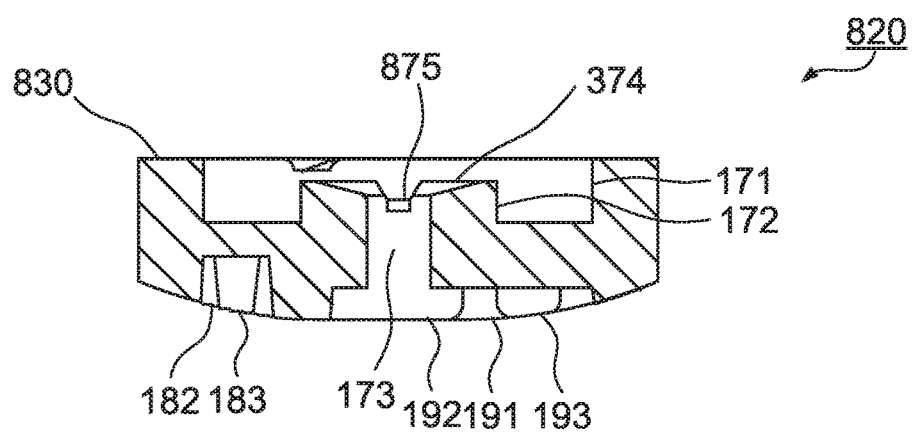
FIG. 14C is a cross-sectional view of the discharge rate adjusting part taken along line C-C of FIG. 14A.

FIG. 14A to FIG. 14C illustrate emitter 820 according to the eighth embodiment of the present invention. FIG. 14A is a plan view of a discharge rate adjusting part of emitter main body 830 of emitter 820, FIG. 14B is a cross-sectional view of the discharge rate adjusting part taken along line B-B of FIG. 14A, and FIG. 14C is a cross-sectional view of the discharge rate adjusting part taken along line C-C of FIG. 14A. As illustrated in FIG. 14A to FIG. 14C, the configuration of emitter 820 is roughly the same as that of emitter 320 except that emitter 820 includes groove 875. Groove 875 is a trapezoid in cross-sectional view. The trapezoid is an isosceles trapezoid with a short lower bottom and a long upper bottom. In addition, the bottom surface of groove 875 is flat.

In emitter 820, mold removal from groove 875 can be more easily performed in resin molding. Accordingly, emitter 820 provides an effect similar to the effect of the third embodiment, and is further advantageous from the viewpoint of high productivity and good dimensional stability of groove 875.

Ninth Embodiment

Figure 15A:
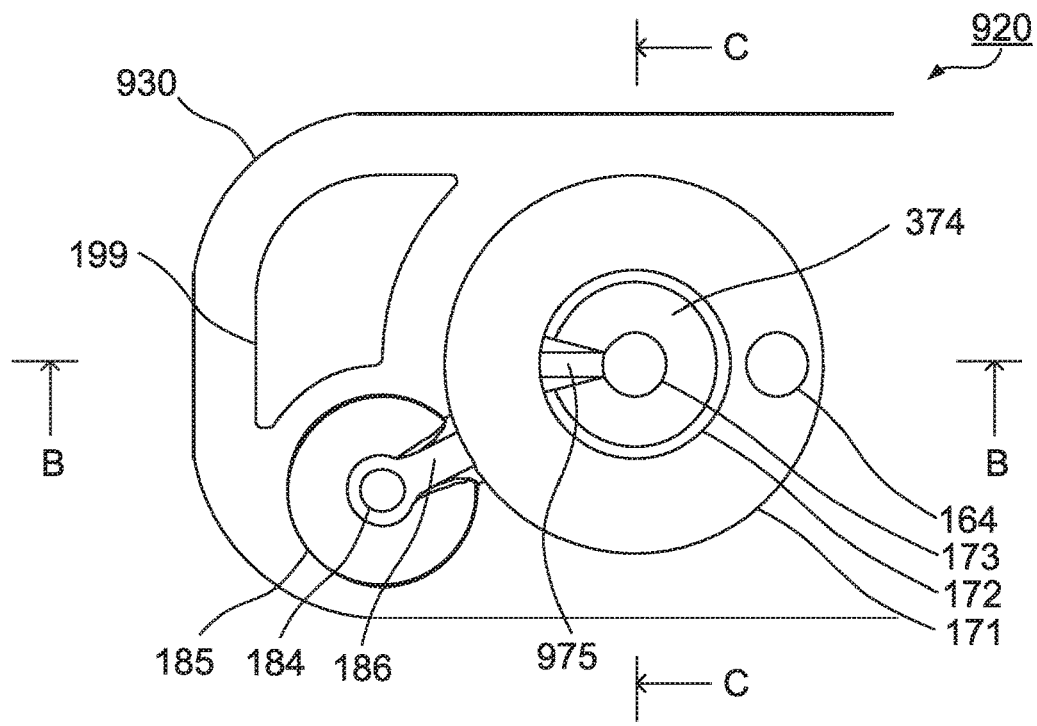
FIG. 15A is a plan view of a discharge rate adjusting part of a ninth embodiment of the present invention.
Figure 15B:
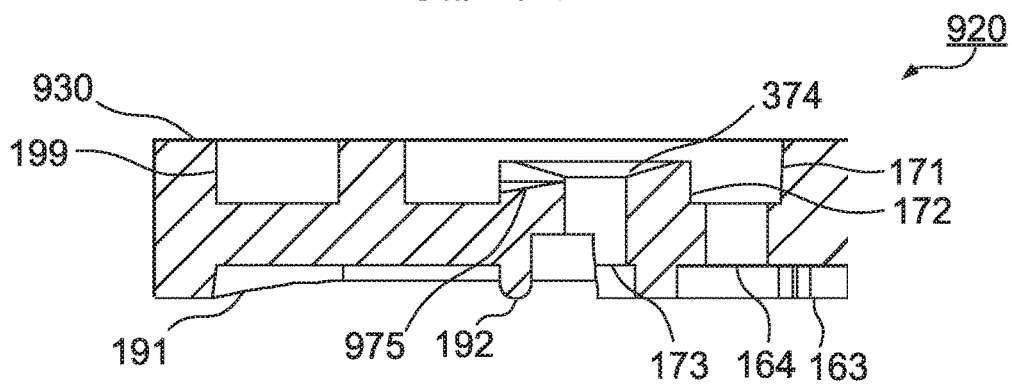
FIG. 15B is a cross-sectional view of the discharge rate adjusting part taken along line B-B of FIG. 15A.
Figure 15C:
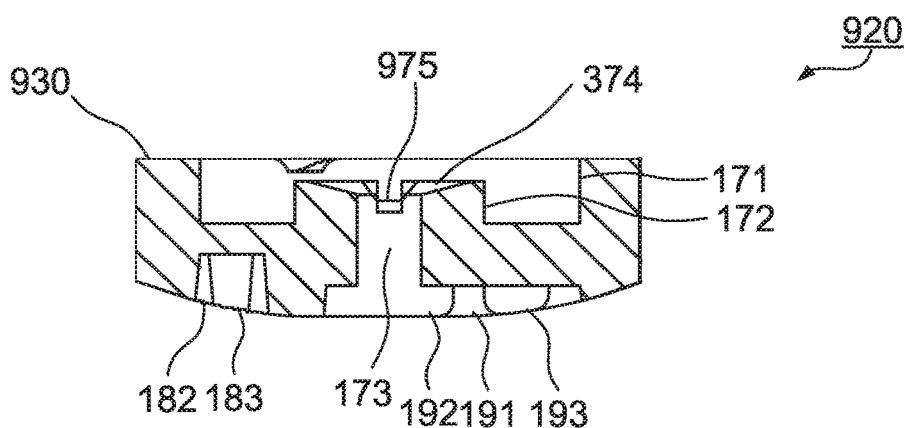
FIG. 15C is a cross-sectional view of the discharge rate adjusting part taken along line C-C of FIG. 15A.

FIG. 15A to FIG. 15C illustrate emitter 920 according to the ninth embodiment of the present invention. FIG. 15A is a plan view of a discharge rate adjusting part of emitter main body 930 of emitter 920, FIG. 15B is a cross-sectional view of the discharge rate adjusting part taken along line B-B of FIG. 15A, and FIG. 15C is a cross-sectional view of the discharge rate adjusting part taken along line C-C of FIG. 15A. As illustrated in FIG. 15A to FIG. 15C, the configuration of emitter 920 is roughly the same as that of emitter 320 except that emitter 920 includes groove 975. The planar shape of the bottom surface of groove 975 is rectangular, and the planar shape of the upper end thereof is a fan shape that expands outward from hole 173 side.

To be more specific, in groove 975, the side walls of groove 975 are upright on hole 173 side and are gradually slanted as it goes toward the outer edge side such that each planar shape is a fan shape that expands outward from hole 173 side. The cross-sectional shape of groove 975 is rectangular on hole 173 side, and is the above-mentioned isosceles trapezoid on the outer side thereof. In the isosceles trapezoid, the upper bottom gradually increases outward from hole 173 side, while the lower bottom is unchanged.

Emitter 920 can further increase the degree of the reduction in opening area of the fine channel defined by groove 975 and first diaphragm part 142 along with the gradual extension of the fine channel in comparison with emitter 320. In addition, in emitter 920, mold removal from groove 975 can be more easily performed in resin molding. Accordingly, emitter 920 provides an effect similar to the effect of the third embodiment, and is further advantageous from the view point of suppressing the discharge rate of the irrigation liquid under high pressure, the viewpoint of high productivity, and the viewpoint of the dimensional stability of groove 975.

As is clear from the above description, as long as at least the depth of the groove gradually decreases at the bottom edge part of the first valve seat part, the bottom surface of the groove may further include a portion slanted upward toward the bottom edge side from the top edge side of the first valve seat part, or may further include both the slanted portion and a plane surface portion in the planar shape of the groove as described in the second, fifth and sixth embodiments.

In addition, the first valve seat part may be formed of a single tapered surface as described in the third, fifth, seventh and ninth embodiments. Further, the first valve seat part may be composed of an annular curved surface whose inclination angle continuously changes from the top edge toward the bottom edge as described in the fourth and sixth embodiments. Furthermore, the planar shape of the groove may be a shape in which the opening area of the fine channel gradually decreases along with the gradual extension of the fine channel in response to the close contact of the first diaphragm part as described in the seventh and ninth embodiments. In addition, the cross-sectional shape of the groove may include a shape that expands upward as described in the eighth and ninth embodiments.

Tenth Embodiment

Figure 16A:
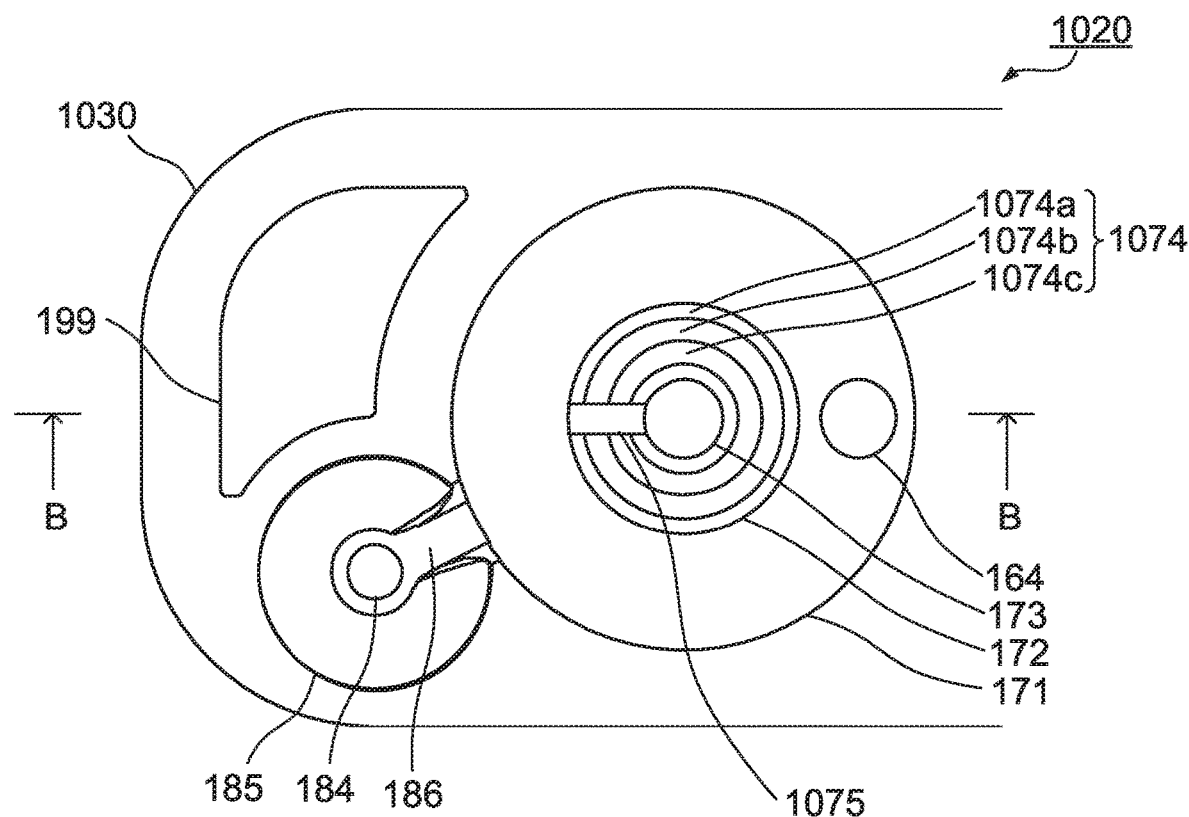
FIG. 16A is a plan view of a discharge rate adjusting part of a tenth embodiment of the present invention.
Figure 16B:
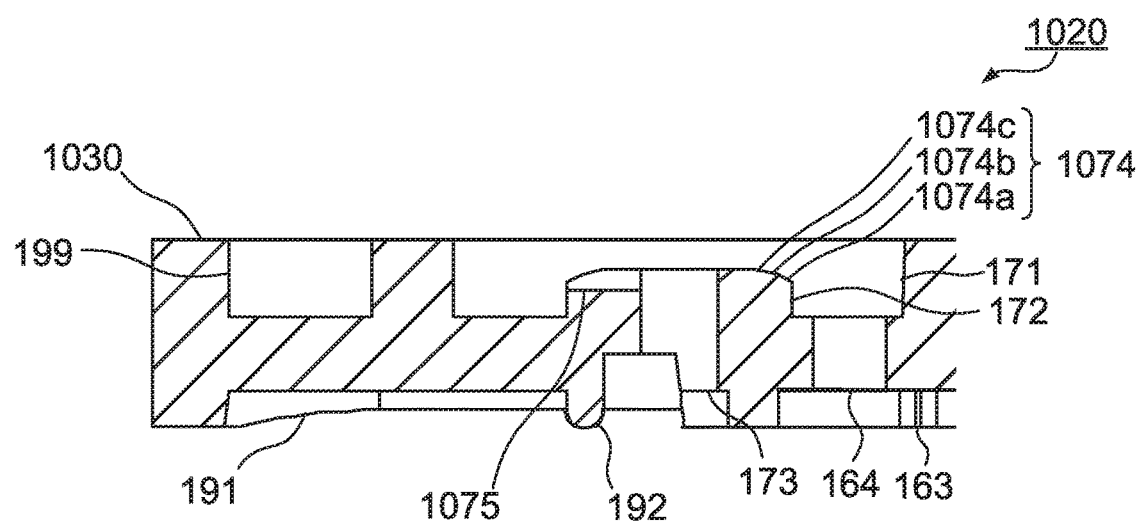
FIG. 16B is a cross-sectional view of the discharge rate adjusting part taken along line B-B of FIG. 16A.

FIG. 16A and FIG. 16B illustrate emitter 1020 according to the tenth embodiment of the present invention. FIG. 16A is a plan view of a discharge rate adjusting part of emitter main body 1030 of emitter 1020, and FIG. 16B is a cross-sectional view of the discharge rate adjusting part taken along line B-B of FIG. 16A. The configuration of emitter 1020 is the same as that of emitter 120 except that emitter 1020 includes first valve seat part 1074 and groove 1075 in place of first valve seat part 174 and groove 175.

First valve seat part 1074 is composed of a protruded annular surface surrounding the edge of hole 173 and slanted downward from the edge. First valve seat part 1074 is composed of outermost first slanted surface part 1074a having a first inclination angle, second slanted surface part 1074b having a second inclination angle and disposed adjacently to first slanted surface part 1074a on the inner side of first slanted surface part 1074a, and third slanted surface part 1074c having a third inclination angle and disposed adjacently to second slanted surface part 1074b on the inner side of second slanted surface part 1074b. The first, second, and third inclination angles decrease in this order, and, for example, are 28°, 13°, and 5°, respectively. With this configuration, first valve seat part 1074 is composed of an annular surface whose inclination angle discontinuously changes from the top edge to the bottom edge.

Groove 1075 has a constant width and a flat bottom surface, and is formed on the surface of first valve seat part 1074 so as to cross first valve seat part 1074 such that the depth thereof gradually decreases from the top edge (hole 173) toward the bottom edge (the outer edge of projection 172) of first valve seat part 1074. The width of groove 1075 is, for example, 0.4 mm. In addition, the depth of groove 1075 is 0.3 mm at the deepest portion thereof (the top edge), and 0.1 mm at the shallowest portion thereof (the bottom edge).

Figure 17A:
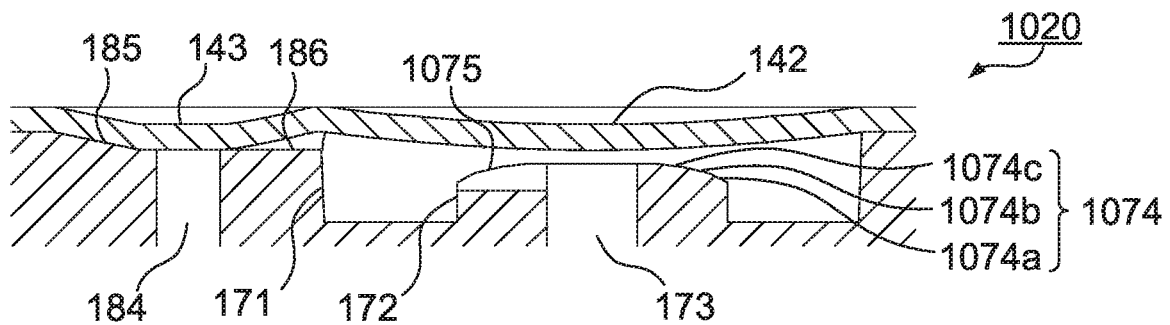
FIG. 17A schematically illustrates a part of a cross section of an emitter according to the tenth embodiment of the present invention along line C-C of FIG. 3A in the case where the outer liquid pressure is equal to or greater than the first set value, FIG. 17B schematically illustrates a part of a cross section of the emitter along line C-C of FIG. 3A in the case where the outer liquid pressure is equal to or greater than the second set value, FIG. 17C schematically illustrates a part of a cross section of the emitter along line C-C of FIG. 3A in the case where the outer liquid pressure is equal to or greater than the third set value, and FIG. 17D schematically illustrates a part of a cross section of the emitter along line C-C of FIG. 3A in the case where the outer liquid pressure is equal to or greater than the fourth set value.

Next, adjustment of the flow rate of the irrigation liquid in the discharge rate adjusting part is described in more detail. FIG. 17A schematically illustrates a part of a cross section of emitter 1020 along line C-C of FIG. 3A in the case where the outer liquid pressure is equal to or greater than the first set value, FIG. 17B schematically illustrates a part of a cross section of emitter 1020 along line C-C of FIG. 3A in the case where the outer liquid pressure is equal to or greater than the second set value, FIG. 17C schematically illustrates a part of a cross section of emitter 1020 along line C-C of FIG. 3A in the case where the outer liquid pressure is equal to or greater than the third set value, and FIG. 17D schematically illustrates a part of a cross section of emitter 1020 along line C-C of FIG. 3A in the case where the outer liquid pressure is equal to or greater than the fourth set value.

Although the mode of first valve seat part 1074 differs from the first embodiment, the discharge rate adjusting part adjusts the discharge rate of the irrigation liquid with a mechanism similar to that of the discharge rate adjusting part of the first embodiment. Specifically, as illustrated in FIG. 17A, when the outer liquid pressure increases to the first set value, first diaphragm part 142 is brought closer to first valve seat part 1074 but does not make contact with first valve seat part 1074 as described above. Accordingly, when the outer liquid pressure is at the first set value, only the adjustment of the flow rate of the irrigation liquid by closing the bypass channel is performed as described above. When the outer liquid pressure further increases from the first set value, the flow rate of the irrigation liquid in the pressure reduction channel increases, and the flow rate of the irrigation liquid which enters hole 173 from a space between first diaphragm part 142 and first valve seat part 1074 increases.

Figure 17B:
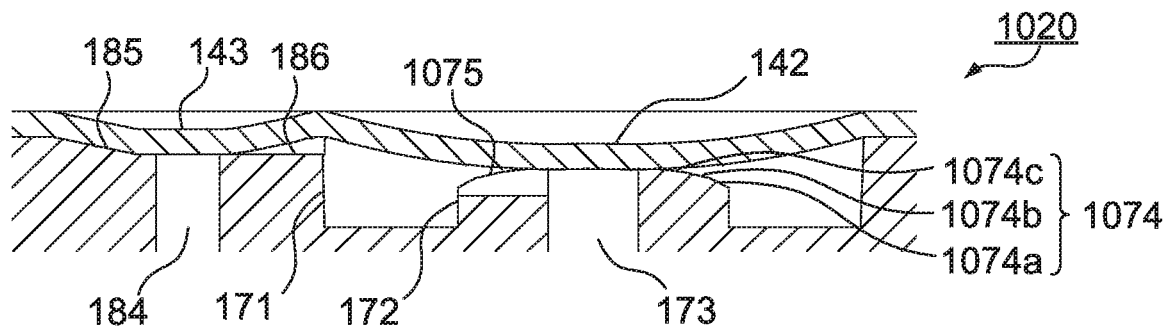
Figure 17C:
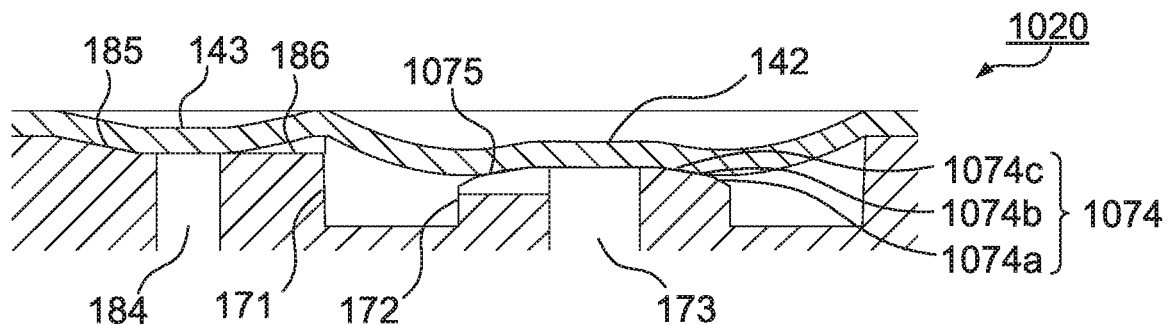
Figure 17D:
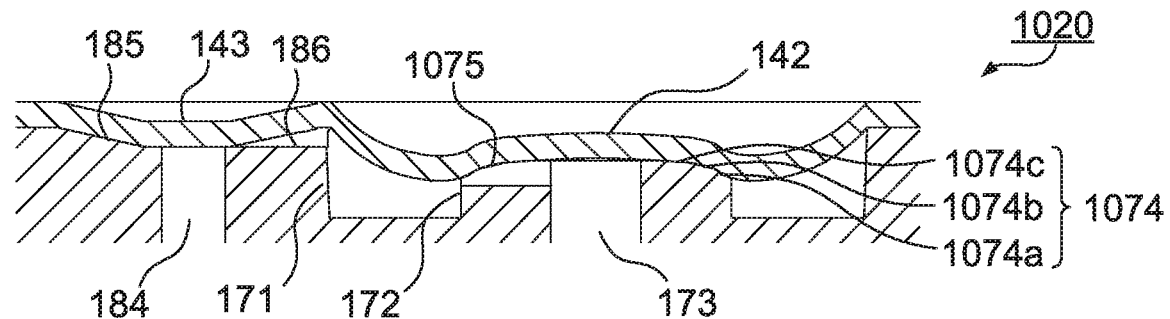

When the outer liquid pressure increases to the second set value, first diaphragm part 142 is more largely deflected, and in addition, since third slanted surface part 1074c is located at the highest position in first valve seat part 1074, first diaphragm part 142 makes close contact with third slanted surface part 1074c of first valve seat part 1074 as illustrated in FIG. 17B such that groove 1075 defines a fine channel surrounded by groove 1075 and first diaphragm part 142. The irrigation liquid in recess 171 passes through the fine channel, and reaches hole 173.

Third slanted surface part 1074c is slanted downward toward the outer edge of projection 172, and therefore, as the outer liquid pressure increases, first diaphragm part 142 makes contact with third slanted surface part 1074c more closely, the length of the fine channel gradually increases, and the size of the opening on the outer edge side gradually decreases. In this manner, when the outer liquid pressure is equal to or greater than the second set value, the flow rate of the irrigation liquid from the discharge rate adjusting part is controlled at the flow rate corresponding to the opening area of the fine channel, and finally, only the irrigation liquid having the flow rate corresponding to the opening area is discharged from discharging port 112.

When the outer liquid pressure further increases from the second set value, the rate of the irrigation liquid which enters emitter 120 increases, the flow rate of the irrigation liquid into recess 171 increases, and the rate of the irrigation liquid to be introduced into hole 173 increases. Meanwhile, the opening area of the fine channel decreases at a speed corresponding to the increase in outer liquid pressure and the third inclination angle of third slanted surface part 1074c. As a result, the increase in flow rate of the irrigation liquid in response to the increase in outer liquid pressure is offset by the reduction in flow rate of the irrigation liquid in response to the reduction in opening area of the fine channel at third slanted surface part 1074c. Accordingly, even when the outer liquid pressure further increases from the second set value, the flow rate of the irrigation liquid which is supplied to hole 173 is maintained at a desired flow rate, and thus the irrigation liquid is discharged from discharging port 112 at the desired flow rate.

When the outer liquid pressure increases to the third set value, first diaphragm part 142 is further pushed toward first valve seat part 1074, and brought into contact with second slanted surface part 1074b more closely as illustrated in FIG. 17C. Then, when the outer liquid pressure further increases from the third set value, the length of the fine channel is further increased, and the opening area of the fine channel is further reduced. Since the second inclination angle of second slanted surface part 1074b is greater than the third inclination angle of third slanted surface part 1074c, the reduction speed of the opening area accordingly increases. As a result, the increase in flow rate of the irrigation liquid in response to the further increase in outer liquid pressure is offset by the reduction in flow rate of the irrigation liquid in response to the further reduction in opening area of the fine channel at second slanted surface part 1074b. Accordingly, even when the outer liquid pressure further increases from the third set value, the flow rate of the irrigation liquid which is supplied to hole 173 is maintained at a desired flow rate, and thus the irrigation liquid is discharged from discharging port 112 at the desired flow rate.

When the outer liquid pressure increases to the fourth set value, first diaphragm part 142 is further pushed toward first valve seat part 1074, and brought into contact with first slanted surface part 1074a more closely as illustrated in FIG. 17D. Then, when the outer liquid pressure further increases from the fourth set value, the length of the fine channel is further increased, and the opening area of the fine channel is further reduced. Since the first inclination angle of first slanted surface part 1074a is yet greater than the second inclination angle of second slanted surface part 1074b, the reduction speed of the opening area accordingly further increases. As a result, the increase in flow rate of the irrigation liquid in response to the further increase in outer liquid pressure is offset by the reduction in flow rate of the irrigation liquid in response to the further reduction in opening area of the fine channel at first slanted surface part 1074a. Accordingly, even when the outer liquid pressure further increases from the fourth set value, the flow rate of the irrigation liquid which is supplied to hole 173 is maintained at a desired flow rate, and thus the irrigation liquid is discharged from discharging port 112 at the desired flow rate.

When first diaphragm part 142 makes close contact with the entirety of first slanted surface part 1074a, the opening area of the fine channel is minimized. Thereafter, when the outer liquid pressure further increases, the flow rate of the irrigation liquid in the pressure reduction channel further increases, and the flow rate of the irrigation liquid which passes through the fine channel gradually and slightly increases.

In this manner, as with emitter 120, emitter 1020 discharges the irrigation liquid from discharging port 112 by the rate of the irrigation liquid which passes through the bypass channel and the pressure reduction channel when the pressure of the irrigation liquid is sufficiently low, and discharges the irrigation liquid from discharging port 112 by the rate of the irrigation liquid which passes through groove 1075 when the pressure of the irrigation liquid is sufficiently high. The opening area of the fine channel decreases at a speed corresponding to the third inclination angle when first diaphragm part 142 makes close contact with third slanted surface part 1074c, at a speed corresponding to the second inclination angle when first diaphragm part 142 makes close contact with second slanted surface part 1074b, and at a speed corresponding to the first inclination angle when first diaphragm part 142 makes close contact with first slanted surface part 1074a. That is, emitter 1020 includes a mechanism that suppresses, three times in the discharge rate adjusting part or four times when the bypass channel is included, the increase in flow rate of the irrigation liquid associated with the increase in outer liquid pressure. Accordingly, emitter 1020 can handle higher outer liquid pressure to adjust the discharge rate of the irrigation liquid to a desired rate.

As is clear from the above description, emitter 1020 also achieves an effect similar to the effect of the first embodiment.

Eleventh Embodiment

Figure 18A:
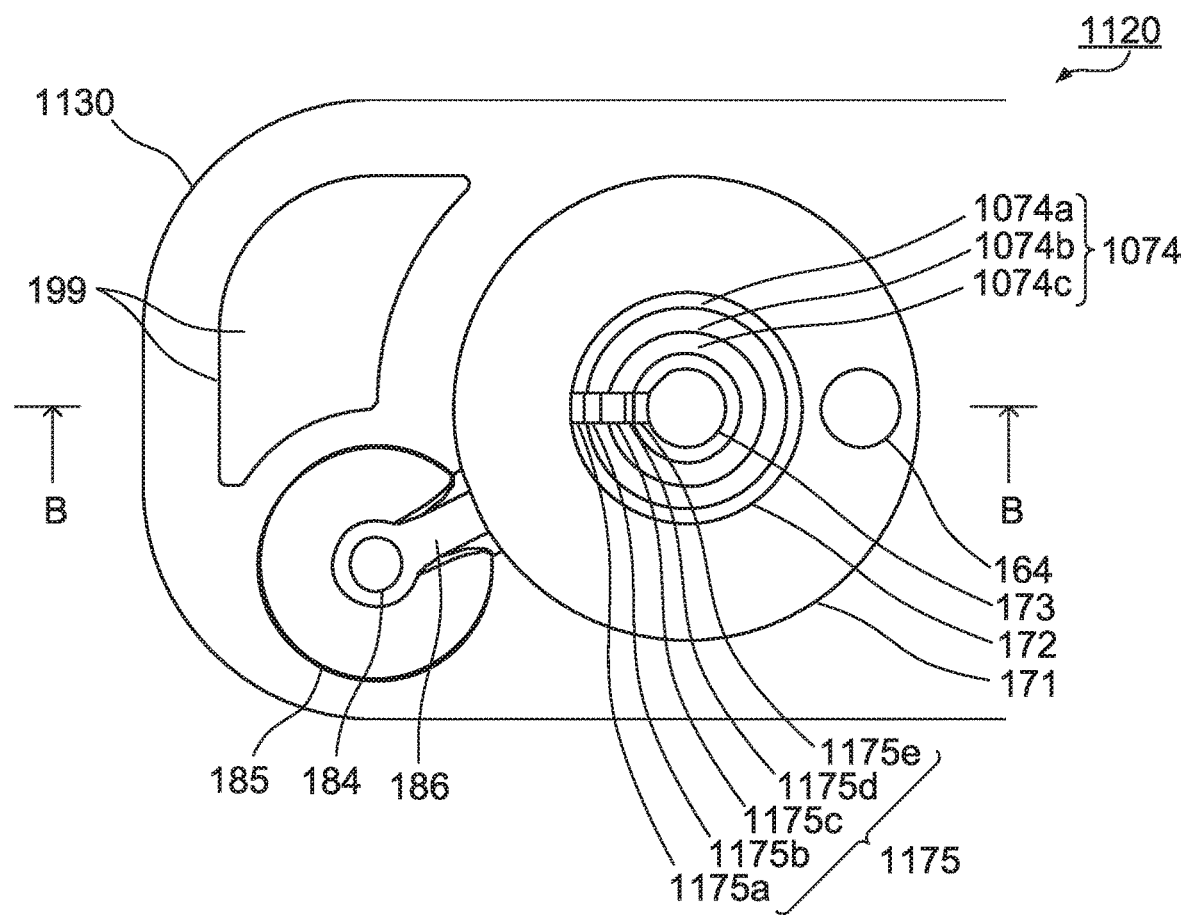
FIG. 18A is a plan view of a discharge rate adjusting part of an eleventh embodiment of the present invention.
Figure 18B:
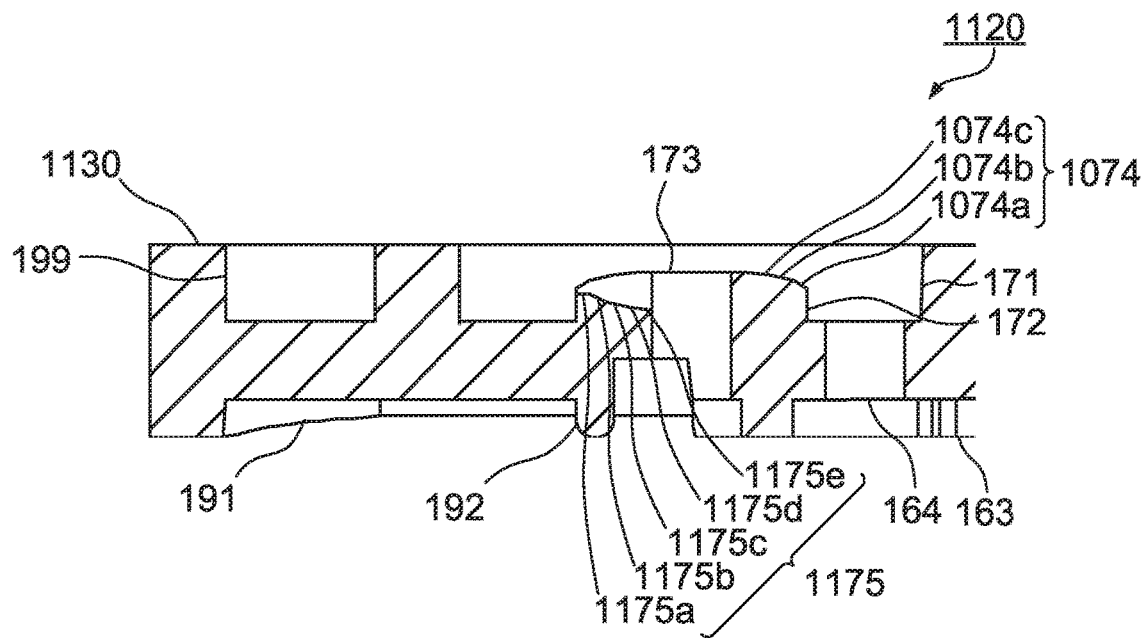
FIG. 18B is a cross-sectional view of the discharge rate adjusting part taken along line B-B of FIG. 18A.

FIG. 18A and FIG. 18B illustrate emitter 1120 according to the eleventh embodiment of the present invention. FIG. 18A is a plan view of a discharge rate adjusting part of emitter main body 1130 of emitter 1120, and FIG. 18B is a cross-sectional view of the discharge rate adjusting part taken along line B-B of FIG. 18A. As illustrated in FIG. 18A and FIG. 18B, the configuration of emitter 1120 is roughly the same as that of emitter 1020 except that emitter 1120 includes groove 1175 in place of groove 1075. The bottom surface of groove 1175 is composed of three-stage plane surfaces and tapered surfaces connecting the three-stage plane surfaces. Specifically, the bottom surface of groove 1175 is composed of outermost first plane surface 1175*a* located at the highest position, first tapered surface 1175*b* slanted downward from first plane surface 1175*a*, second plane surface 1175*c* continuously connected with first tapered surface 1175*b*, second tapered surface 1175*d* slanted downward from second plane surface 1175*c*, and third plane surface 1175*e* continuously connected with second tapered surface 1175*d*.

In emitter 1120, the degree of the reduction in opening area of the fine channel defined by groove 1175 and first diaphragm part 142 along with the gradual extension of the fine channel is more significant than emitter 1020. Accordingly, emitter 1120 is further advantageous from the viewpoint of suppressing the discharge rate of the irrigation liquid under high pressure in addition to the effect of the tenth embodiment.

Twelfth Embodiment

Figure 19A:
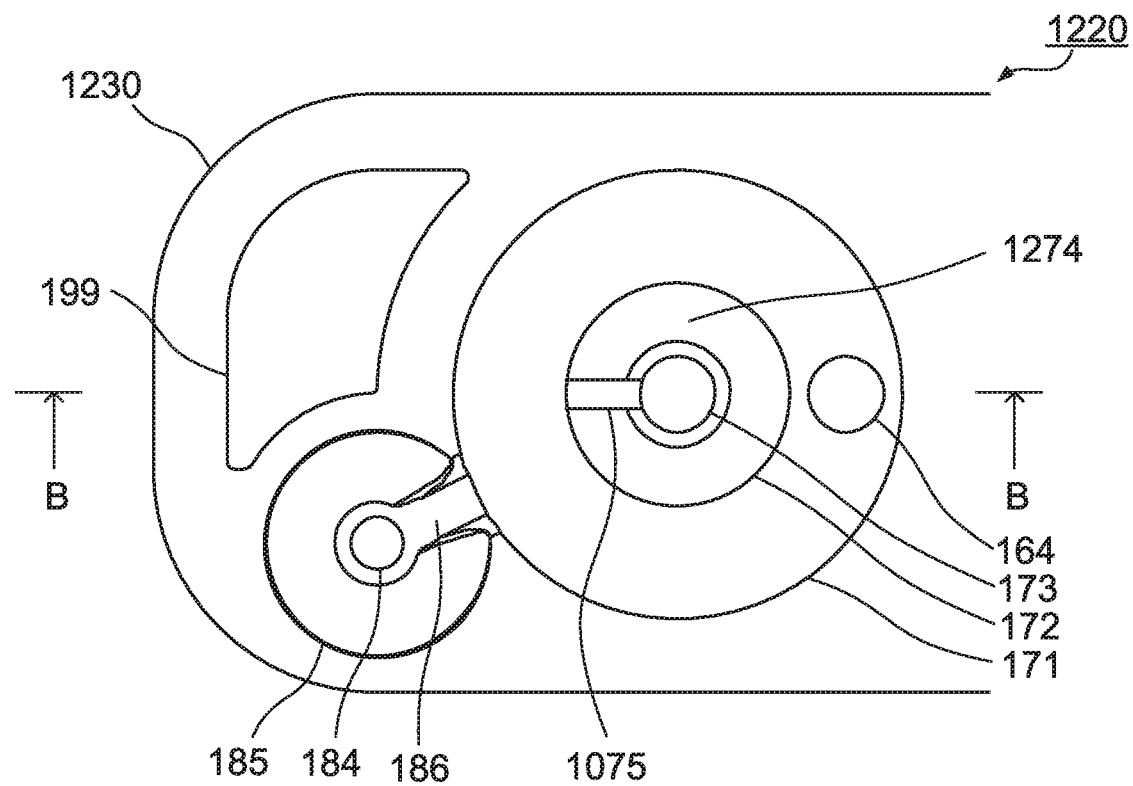
FIG. 19A is a plan view of a discharge rate adjusting part of a twelfth embodiment of the present invention.
Figure 19B:
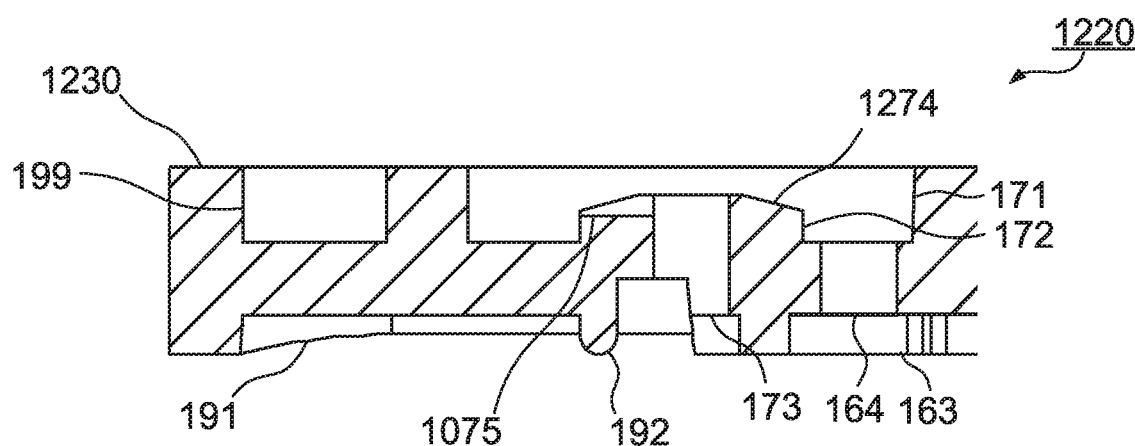
FIG. 19B is a cross-sectional view of the discharge rate adjusting part taken along line B-B of FIG. 19A.

FIG. 19A and FIG. 19B illustrate emitter 1220 according to the twelfth embodiment of the present invention. FIG. 19A is a plan view of a discharge rate adjusting part of emitter main body 1230 of emitter 1220, and FIG. 19B is a cross-sectional view of the discharge rate adjusting part taken along line B-B of FIG. 19A. As illustrated in FIG. 19A and FIG. 19B, the configuration of emitter 1220 is roughly the same as that of emitter 1020 except that emitter 1220 includes first valve seat part 1274 composed of a single tapered surface in place of first valve seat part 1074. First valve seat part 1274 is formed of a tapered surface whose cross-sectional shape is a straight line slanted downward from the top edge (hole 173) side toward the bottom edge (outer edge) side of first valve seat part 1274.

In emitter 1220, the degree of the reduction in opening area of the fine channel defined by groove 1075 and first diaphragm part 142 along with the gradual extension of the fine channel is constant. Accordingly, emitter 1220 has an effect identical to the effect of the tenth embodiment except for the effect of suppressing the flow rate of the irrigation liquid under high pressure with first valve seat part 1074, and is further advantageous from the viewpoint of simply forming the discharge rate adjusting part.

Thirteenth Embodiment

Figure 20A:
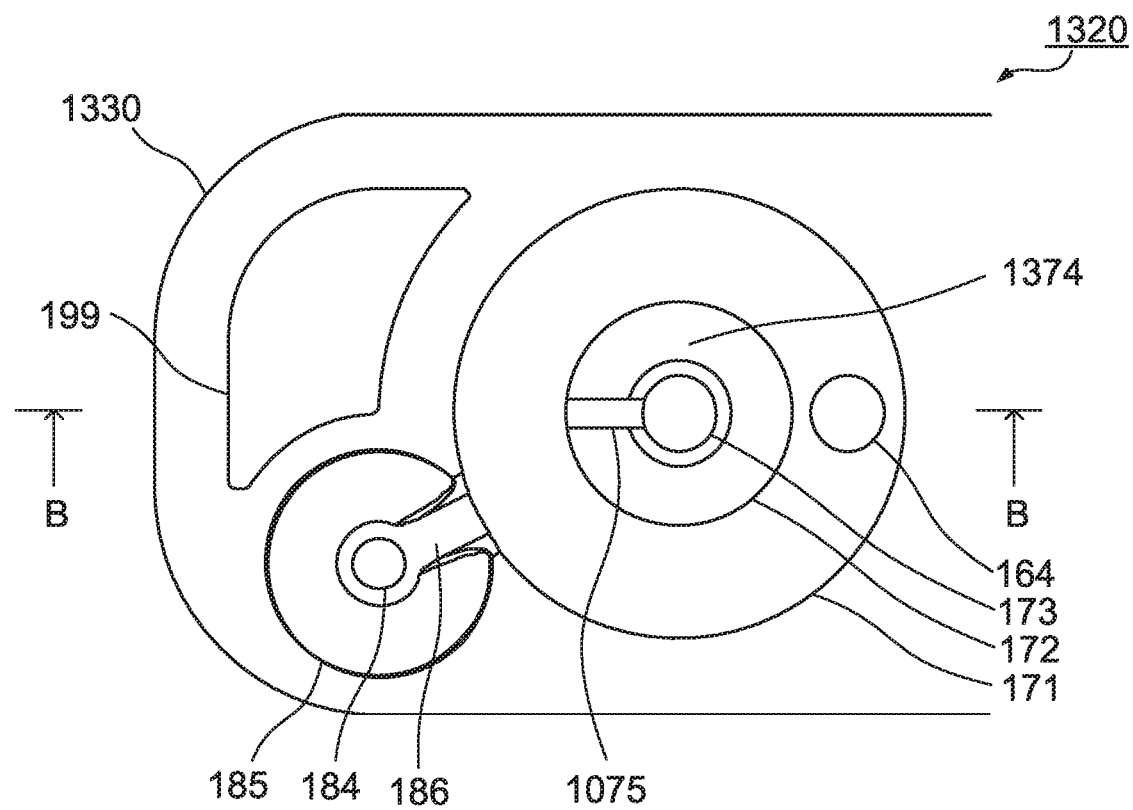
FIG. 20A is a plan view of a discharge rate adjusting part of a thirteenth embodiment of the present invention.
Figure 20B:
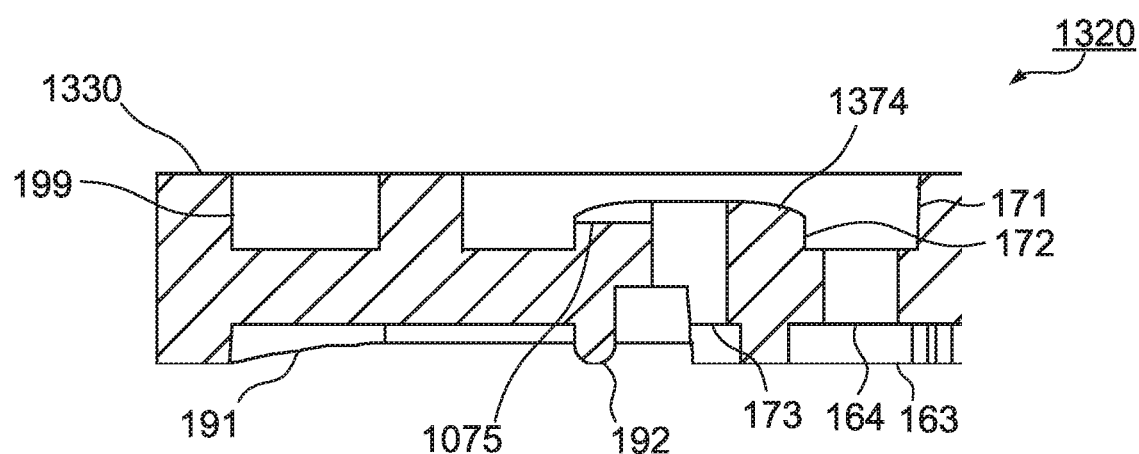
FIG. 20B is a cross-sectional view of the discharge rate adjusting part taken along line B-B of FIG. 20A.

FIG. 20A and FIG. 20B illustrate emitter 1320 according to the thirteenth embodiment of the present invention. FIG. 20A is a plan view of a discharge rate adjusting part of emitter main body 1330 of emitter 1320, and FIG. 20B is a cross-sectional view of the discharge rate adjusting part taken along line B-B of FIG. 20A. As illustrated in FIG. 20A and FIG. 20B, the configuration of emitter 1320 is roughly the same as that of emitter 1020 except that emitter 1320 includes first valve seat part 1374 composed of a single annular curved surface in place of first valve seat part 1074. First valve seat part 1374 is formed of an annular curved surface whose cross-sectional shape is an elliptical arc in which an inclination angle, which is the tangent to the cross-sectional shape, gradually increases from the top edge (hole 173) side toward the bottom edge (outer edge) side of first valve seat part 1374.

In emitter 1320, the reduction in opening area of the fine channel defined by groove 1075 and first diaphragm part 142 along with the gradual extension of the fine channel by is further smooth. Accordingly, emitter 1320 has an effect identical to the effect of the tenth embodiment, and is further advantageous from the viewpoint of suppressing variations in adjustment of the discharge rate by the discharge rate adjusting part.

Fourteenth Embodiment

Figure 21A:
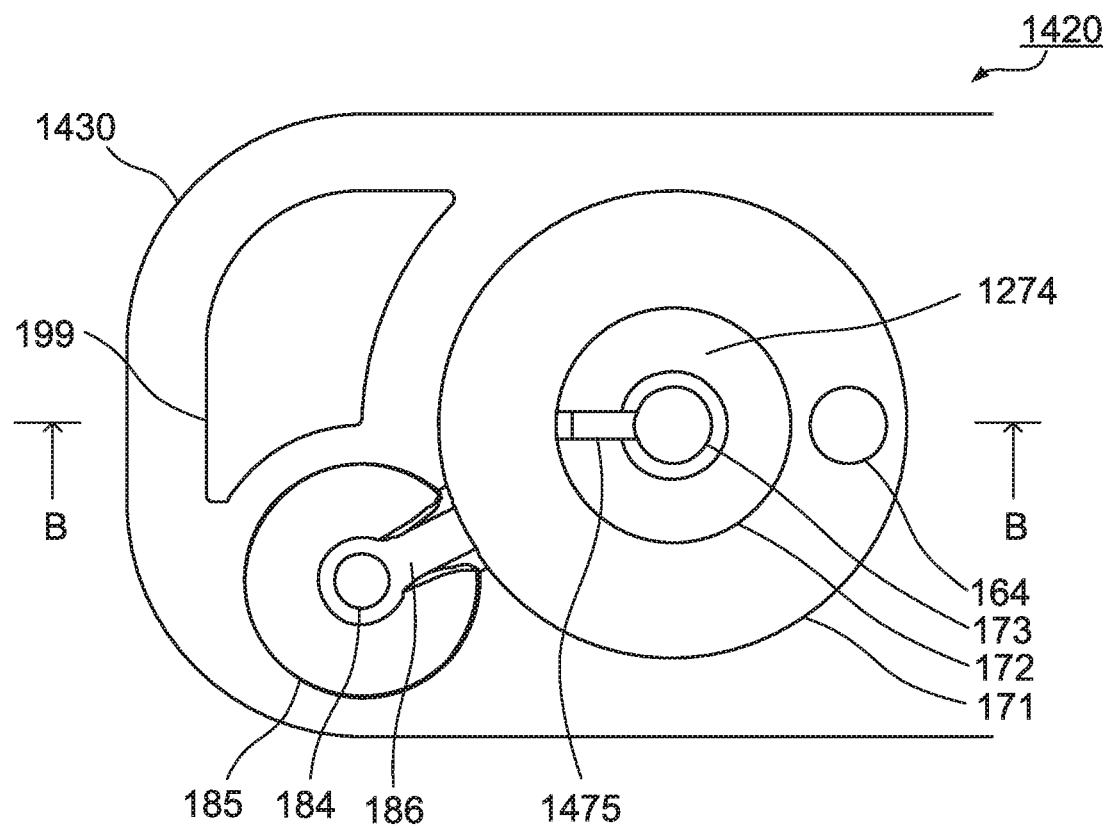
FIG. 21A is a plan view of a discharge rate adjusting part of a fourteenth embodiment of the present invention.
Figure 21B:
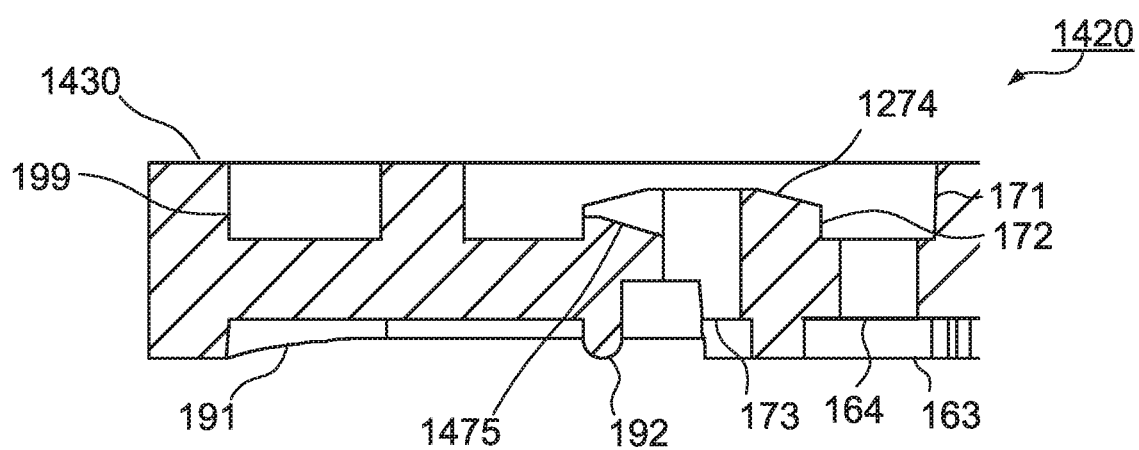
FIG. 21B is a cross-sectional view of the discharge rate adjusting part taken along line B-B of FIG. 21A.

FIG. 21A and FIG. 21B illustrate emitter 1420 according to the fourteenth embodiment of the present invention. FIG. 21A is a plan view of a discharge rate adjusting part of emitter main body 1430 of emitter 1420, and FIG. 21B is a cross-sectional view of the discharge rate adjusting part taken along line B-B of FIG. 21A. As illustrated in FIG. 21A and FIG. 21B, the configuration of emitter 1420 is roughly the same as that of emitter 1220 except that emitter 1420 includes groove 1475 having a tapered bottom surface in place of groove 1075. The bottom surface of groove 1475 is formed of a tapered surface whose cross-sectional shape is a straight line slanted downward from the outer (recess 171) side toward the inner (hole 173) side of projection 172.

Emitter 1420 can increase the degree of the reduction in opening area of the fine channel defined by groove 1475 and first diaphragm part 142 along with the gradual extension of the fine channel in comparison with emitter 1220. Accordingly, emitter 1420 provides an effect similar to the effect of the twelfth embodiment, and is further advantageous from the viewpoint of suppressing the discharge rate of the irrigation liquid under high pressure.

Fifteenth Embodiment

Figure 22A:
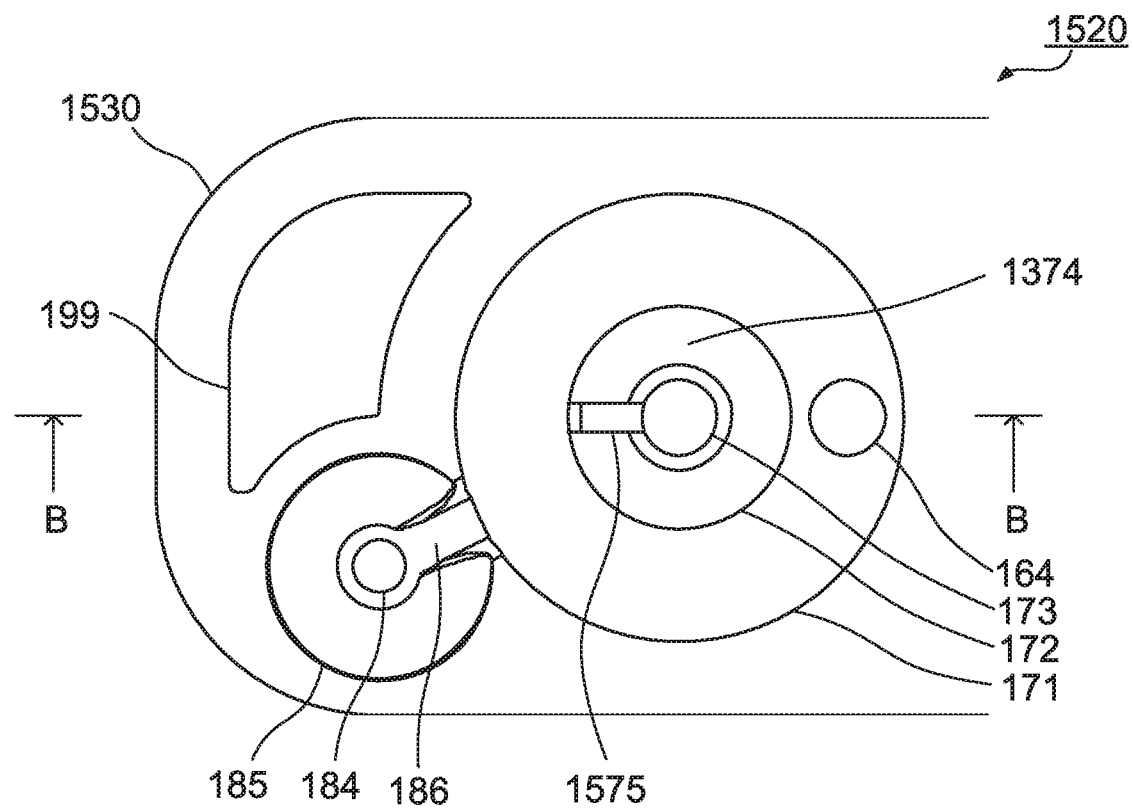
FIG. 22A is a plan view of a discharge rate adjusting part of a fifteenth embodiment of the present invention.
Figure 22B:
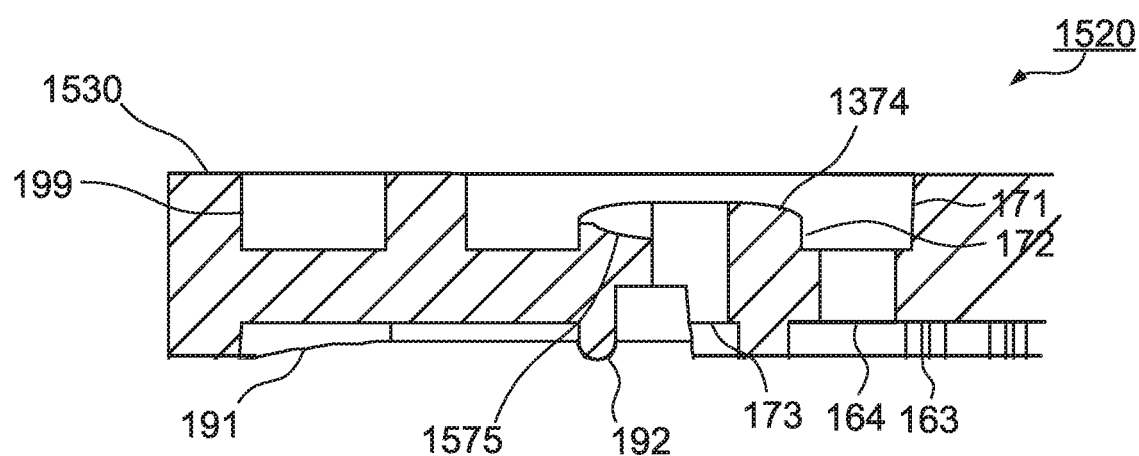
FIG. 22B is a cross-sectional view of the discharge rate adjusting part taken along line B-B of FIG. 22A.

FIG. 22A and FIG. 22B illustrate emitter 1520 according to the fifteenth embodiment of the present invention. FIG. 22A is a plan view of a discharge rate adjusting part of emitter main body 1530 of emitter 1520, and FIG. 22B is a cross-sectional view of the discharge rate adjusting part taken along line B-B of FIG. 22A. As illustrated in FIG. 22A and FIG. 22B, the configuration of emitter 1520 is roughly the same as that of emitter 1320 except that emitter 1520 includes groove 1575. The bottom surface of groove 1575 is formed of a curved surface whose cross-sectional shape is an elliptical arc in which an inclination angle, which is an angle between the tangent to the cross-sectional shape and a plane orthogonal to the axis of hole 173, gradually decreases from the outer (recess 171) side toward the inner (hole 173) side of projection 172.

In emitter 1520, the reduction in opening area of the fine channel defined by groove 1575 and first diaphragm part 142 along with the gradual extension of the fine channel is further smooth, and further significant. Accordingly, emitter 1520 has an effect identical to the effect of the thirteenth embodiment, and is further advantageous from the viewpoint of smoothly suppressing the discharge rate of the irrigation liquid under high pressure.

As is clear from the above description, as long as at least the depth of the groove gradually decreases at the bottom edge part of the first valve seat part, the bottom surface of the groove may further include a portion slanted upward from the top edge side of the first valve seat part toward the bottom edge side in the planar shape of the groove, or may further include both the slanted portion and a plane surface portion as described in the eleventh, fourteenth and fifteenth embodiments. In addition, the first valve seat part may be formed of a single tapered surface as described in the twelfth and fourteenth embodiments. Further, the first valve seat part may be composed of an annular curved surface whose inclination angle continuously changes from the top edge toward the bottom edge as described in the thirteenth and fifteenth embodiments.

In addition, in the tenth to fifteenth embodiments, the cross-sectional shape of the groove may expand upward as described in the eighth embodiment for example. In this case, as in the eighth embodiment, improvement in productivity and dimensional stability can also be achieved.

In addition, while the inclination angle of the first valve seat part is constant, varies in three-stage, or continuously varies in the embodiments, the inclination angle may be appropriately set as long as the first valve seat part can be manufactured, and may be changed in two-stage, four-stage or greater stages, for example.

In addition, while, as the length of the fine channel increases, the inclination angle of the first valve seat part or the bottom surface of the groove increases in the embodiments, the first valve seat part and the groove whose inclination angle changes may be appropriately designed as long as the discharge rate adjusting part can be manufactured, and, for example, may be configured such that the inclination angle decreases as the length of the fine channel increases, or that the inclination angle of the first valve seat part gradually increases or gradually decreases whereas the inclination angle of the bottom surface of the groove gradually decreases or gradually increases, as the length of the fine channel increases.

In addition, while the bypass channel is provided in each embodiment, the emitter according to the embodiments of the present invention may not include the bypass channel Such an emitter adjusts the discharge rate of the irrigation liquid with the discharge rate adjusting part in the same manner as the embodiments except that the irrigation liquid is not supplied from the bypass channel to recess 171 when the outer liquid pressure is sufficiently low. Accordingly, the emitter provided with no bypass channel and the drip irrigation tube including such an emitter achieve effects identical to the effects of the embodiments except for the effect of increasing the discharge rate of the irrigation liquid under low pressure.

This application is entitled to and claims the benefit of Japanese Patent Application No. 2015-108617 dated May 28, 2015, the disclosure of which including the specification, drawings and abstract is incorporated herein by reference in its entirety.

INDUSTRIAL APPLICABILITY

According to the present invention, an emitter which can drop liquid with an appropriate rate by the pressure of the liquid to be dropped can be easily provided. Accordingly, popularization of the emitter in the technical fields of drip irrigations and endurance tests where long-term dropping is required, and development in the technical fields can be expected.

REFERENCE SIGNS LIST

100 Drip irrigation tube
110 Tube
112 Discharging port
120, 220, 320, 420, 520, 620, 720, 820, 920, 1020, 1120, 1220, 1320, 1420, 1520 Emitter
130, 230, 330, 430, 530, 630, 730, 830, 930, 1030, 1130, 1230, 1330, 1430, 1530 Emitter main body
140 Film
141 Hinge part
142 First diaphragm part
143 Second diaphragm part
151 Slit
152, 162, 171, 191, 199 Recess
161 First pressure reduction channel part
163 Second pressure reduction channel part
164, 173, 184 Hole
172 Projection
174, 374, 474, 1074, 1274, 1374 First valve seat part
174a, 1074a First slanted surface part
174b, 1074b Second slanted surface part
174c, 1074c Third slanted surface part
175, 182, 275, 575, 675, 775, 875, 975, 1075, 1175, 1475, 1575 Groove
181 Third pressure reduction channel part
183 Projection
185 Second valve seat part
186 Guide groove
192 Main-projection
193 Sub-projection
275a, 1175a First plane surface
275b Tapered surface
275c, 1175c Second plane surface
1175b First tapered surface
1175d Second tapered surface
1175e Third plane surface

The invention claimed is:

1. An emitter configured to be joined on an inner wall surface of a tube for carrying irrigation liquid at a position corresponding to a discharging port communicating between inside and outside of the tube, the emitter being configured to quantitatively discharge the irrigation liquid in the tube from the discharging port to the outside of the tube, the emitter comprising:
    a water intake part for intake of the irrigation liquid;
    a first pressure reduction channel part for forming a first pressure reduction channel that allows the irrigation liquid received at the water intake part to flow therethrough while reducing a pressure of the irrigation liquid received at the water intake part;
    a discharge rate adjusting part for controlling a flow rate of the irrigation liquid supplied from the first pressure reduction channel in accordance with a pressure of the irrigation liquid in the tube; and
    a discharging part for housing the irrigation liquid supplied from the discharge rate adjusting part, the discharging part being configured to face the discharging port, wherein:
    the discharge rate adjusting part includes:
        a hole for communicating between the first pressure reduction channel and the discharging part,
        a first valve seat part surrounding an edge of the hole, and composed of a protruded annular surface slanted from the edge or a recessed annular surface slanted toward the edge, a groove formed on a surface of the first valve seat part to cross the first valve seat part, wherein a depth of the groove from the surface of the first valve seat part gradually decreases in a direction from a top edge to a bottom edge of the first valve seat part at at least a bottom edge part of the first valve seat part, and a film having flexibility, and disposed such that the film is separated from the first valve seat part at a position where the film is allowed to gradually make contact with the first valve seat part from the top edge toward the bottom edge when the pressure of the irrigation liquid in the tube is equal to or greater than a set value, the emitter further comprising an emitter main body and the film joined to and disposed on a top surface of the emitter main body, and the water intake part, the first pressure reduction channel part, the discharging part, the hole, the first valve seat part, and the groove are disposed on the emitter body.

2. The emitter according to claim 1, wherein the protruded annular surface or the recessed annular surface is composed of an annular surface whose inclination angle discontinuously changes from the top edge toward the bottom edge of the first valve seat part.

3. The emitter according to claim 1, wherein the protruded annular surface or the recessed annular surface is composed of an annular curved surface whose inclination angle continuously changes from the top edge toward the bottom edge of the first valve seat part.

4. The emitter according to claim 1, wherein a bottom surface of the groove includes a portion slanted in the direction from the top edge to the bottom edge of the first valve seat part.

5. The emitter according to claim 1, further comprising a bypass channel part for forming a bypass channel that bypasses a part or all of the first pressure reduction channel part and communicates between an upstream side of the discharge rate adjusting part and the water intake part, wherein the bypass channel part further includes a second valve seat part capable of making contact with the film under the pressure of the irrigation liquid in the tube such that the film closes the bypass channel.

6. The emitter according to claim 5, wherein the bypass channel part further includes a guide groove for guiding, to the upstream side of the discharge rate adjusting part, the irrigation liquid supplied to the second valve seat part.

7. The emitter according to claim 5, wherein the bypass channel part further includes a second pressure reduction channel part for forming a second pressure reduction channel configured to allow the irrigation liquid to flow toward the second valve seat part while reducing the pressure of the irrigation liquid.

8. The emitter according to claim 1, wherein the water intake part includes a screen part including a slit that opens to the inside of the tube.

9. The emitter according to claim 1, wherein the discharging part includes an intrusion preventing part for preventing intrusion of foreign matters from the discharging port.

10. The emitter according to claim 1, wherein the emitter is integrally molded with a resin material having flexibility.

11. A drip irrigation tube comprising:

the tube including the discharging port for discharging irrigation liquid; and the emitter according to claim 1 joined on the inner wall surface of the tube at a position corresponding to the discharging port.

* * * * *